(12) United States Patent
Och et al.

(10) Patent No.: US 10,089,304 B2
(45) Date of Patent: *Oct. 2, 2018

(54) ENCODING AND ADAPTIVE, SCALABLE ACCESSING OF DISTRIBUTED MODELS

(71) Applicant: Google LLC, Mountain View, CA (US)

(72) Inventors: Franz Josef Och, Palo Alto, CA (US); Jeffrey Dean, Palo Alto, CA (US); Thorsten Brants, Palo Alto, CA (US); Alexander Mark Franz, Palo Alto, CA (US); Jay Ponte, Mountain View, CA (US); Peng Xu, San Jose, CA (US); Sha-Mayn Teh, San Mateo, CA (US); Jeffrey Chin, San Francisco, CA (US); Ignacio E. Thayer, San Francisco, CA (US); Anton Carver, London (GB); Daniel Rosart, Mountain View, CA (US); John S. Hawkins, San Francisco, CA (US); Karel Driesen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/480,722

(22) Filed: Apr. 6, 2017

(65) Prior Publication Data

US 2017/0212887 A1    Jul. 27, 2017

Related U.S. Application Data

(63) Continuation of application No. 14/285,693, filed on May 23, 2014, now Pat. No. 9,619,465, which is a
(Continued)

(51) Int. Cl.
*G06F 17/28* (2006.01)

(52) U.S. Cl.
CPC ........ *G06F 17/289* (2013.01); *G06F 17/2818* (2013.01); *G06F 17/2836* (2013.01); *G06F 17/2845* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795;
(Continued)

(56) References Cited

U.S. PATENT DOCUMENTS 4,991,094 A    2/1991   Fagan
5,510,981 A    4/1996   Berger et al.
(Continued)

OTHER PUBLICATIONS

AltaVista—Babel Fish Translation, .Copyrgt. 2006, Retrieved from the Internet: http://babelfish.altavista.com/, 1 pg.
(Continued)

*Primary Examiner* — Lamont Spooner
(74) *Attorney, Agent, or Firm* — Fish & Richardson P.C.

(57) ABSTRACT

Systems, methods, and apparatus for accessing distributed models in automated machine processing, including using large language models in machine translation, speech recognition and other applications.

20 Claims, 15 Drawing Sheets

Related U.S. Application Data continuation of application No. 13/657,313, filed on Oct. 22, 2012, now Pat. No. 8,738,357, which is a continuation of application No. 12/092,820, filed as application No. PCT/US2007/004196 on Feb. 16, 2007, now Pat. No. 8,296,123.

(60) Provisional application No. 60/775,570, filed on Feb. 21, 2006, provisional application No. 60/774,790, filed on Feb. 17, 2006.

(58) Field of Classification Search
CPC .. G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC ................ 704/1–10; 707/706–708; 715/264; 709/201, 203, 243
See application file for complete search history.

(56) References Cited

U.S. PATENT DOCUMENTS

| | | | |
|---|---|---|---|
| 5,715,466 | A | 2/1998 | Flanagan |
| 5,751,957 | A | 5/1998 | Hiroya et al. |
| 5,848,386 | A | 12/1998 | Motoyama |
| 5,918,051 | A | 6/1999 | Savitzky |
| 5,946,498 | A | 8/1999 | Chiang et al. |
| 6,067,545 | A | 5/2000 | Wolff |
| 6,085,162 | A | 7/2000 | Cherny |
| 6,092,035 | A | 7/2000 | Kurachi |
| 6,131,082 | A | 10/2000 | Hargrave, III et al. |
| 6,161,083 | A | 12/2000 | Franz |
| 6,167,369 | A | 12/2000 | Schulze |
| 6,182,026 | B1 | 1/2001 | Tillmann |
| 6,208,956 | B1 | 3/2001 | Motoyama |
| 6,278,969 | B1 | 8/2001 | King et al. |
| 6,338,033 | B1 | 1/2002 | Bourbonnais et al. |
| 6,347,316 | B1 | 2/2002 | Redpath |
| 6,360,273 | B1 | 3/2002 | Beurket et al. |
| 6,446,133 | B1 | 9/2002 | Tan et al. |
| 6,473,781 | B1 | 10/2002 | Skagerwall et al. |
| 6,526,426 | B1 | 2/2003 | Lakritz |
| 6,665,642 | B2 | 12/2003 | Kanevsky |
| 6,789,057 | B1 | 9/2004 | Morimoto et al. |
| 6,795,434 | B1 | 9/2004 | Kumar et al. |
| 6,904,402 | B1 | 6/2005 | Wang et al. |
| 6,907,546 | B1 | 6/2005 | Haswell |
| 6,922,670 | B2 | 7/2005 | Yamada et al. |
| 6,985,850 | B1 | 1/2006 | Scanlan |
| 7,027,975 | B1 | 4/2006 | Pazandak |
| 7,089,493 | B2 | 8/2006 | Hatori et al. |
| 7,225,199 | B1 | 5/2007 | Green |
| 7,277,732 | B2 | 10/2007 | Chen |
| 7,366,654 | B2 | 4/2008 | Moore |
| 7,533,333 | B2 | 5/2009 | Motoyama et al. |
| 7,546,234 | B1 | 6/2009 | Deb |
| 7,809,882 | B1 | 10/2010 | Liu |
| 7,953,935 | B2 | 5/2011 | Okabayashi |
| 7,983,897 | B2 | 7/2011 | Chin et al. |
| 8,296,123 | B2 * | 10/2012 | Thayer et al. ............... 704/2 |
| 8,370,395 | B1 | 2/2013 | Gupta |
| 2001/0018649 | A1 | 8/2001 | Kasai et al. |
| 2001/0029455 | A1 | 10/2001 | Chin et al. |
| 2002/0040292 | A1 | 4/2002 | Marcu |
| 2002/0040359 | A1 | 4/2002 | Green |
| 2002/0078117 | A1 | 6/2002 | Wang Baldonado |
| 2002/0078130 | A1 | 6/2002 | Thornton |
| 2002/0103632 | A1 | 8/2002 | Dutta et al. |
| 2002/0188439 | A1 | 12/2002 | Marcu |
| 2003/0004702 | A1 | 1/2003 | Higinbotham |
| 2003/0014254 | A1 | 1/2003 | Zhang et al. |
| 2003/0041095 | A1 | 2/2003 | Konda |
| 2003/0061022 | A1 | 3/2003 | Reinders |
| 2003/0097429 | A1 | 5/2003 | Wu et al. |
| 2003/0115186 | A1 | 6/2003 | Wilkinson |
| 2003/0140316 | A1 | 7/2003 | Lakritz |
| 2003/0154071 | A1 | 8/2003 | Shreve |
| 2003/0204573 | A1 | 10/2003 | Beck |
| 2003/0212540 | A1 | 11/2003 | Meredith |
| 2003/0212962 | A1 | 11/2003 | Chin et al. |
| 2003/0225569 | A1 | 12/2003 | Shimamura |
| 2004/0044517 | A1 | 3/2004 | Palmquist |
| 2004/0098247 | A1 | 5/2004 | Moore |
| 2004/0117189 | A1 | 6/2004 | Bennett |
| 2004/0167768 | A1 | 8/2004 | Travieso |
| 2004/0210434 | A1 | 10/2004 | Wang |
| 2004/0230572 | A1 | 11/2004 | Omoigui |
| 2004/0237044 | A1 | 11/2004 | Travieso et al. |
| 2004/0243392 | A1 | 12/2004 | Chino et al. |
| 2005/0038643 | A1 | 2/2005 | Koehn |
| 2005/0049851 | A1 | 3/2005 | Watanabe et al. |
| 2005/0137855 | A1 | 6/2005 | Maxwell |
| 2005/0149906 | A1 | 7/2005 | Okrongli |
| 2005/0234864 | A1 | 10/2005 | Shapiro |
| 2005/0235018 | A1 | 10/2005 | Tsinman |
| 2005/0246156 | A1 | 11/2005 | Scanlan |
| 2006/0004560 | A1 | 1/2006 | Whitelock |
| 2006/0080079 | A1 | 4/2006 | Yamabana |
| 2006/0101450 | A1 | 5/2006 | Datta |
| 2006/0143350 | A1 | 6/2006 | Miloushev |
| 2006/0200339 | A1 | 9/2006 | Satake |
| 2006/0206303 | A1 | 9/2006 | Kohlmeier et al. |
| 2007/0005339 | A1 | 1/2007 | Jaquinta |
| 2007/0118399 | A1 | 5/2007 | Avinash |
| 2007/0150257 | A1 | 6/2007 | Cancedda et al. |

OTHER PUBLICATIONS

Bahl, L. et al., "A tree-based statistical language model for natural language speech recognition," IEEE Transactions on Acoustics, Speech, and Signal Processing 37(7): 1001-1008 (Jul. 1989).

Brants, T. et al., "Large language models in machine translation"; Proceedings of the 2007 Joint Conference on Empirical Methods in Natural Language Processing and Computational Natural Language Learning Prague, CZ [Online] Jun. 28, 2007, pp. 858-867; http://acl.ldc.upenn.edu/D/D07/D07-1090.pdf [retrieved on Nov. 12, 2008].

Brill, E. et al., "An Improved Error Model for Noisy Channel Spelling Correction," In Proceedings, 38th Annual Meeting of the Association for Computational Linguistics, Hong Kong, pp. 286-293. (Oct. 2000).

Brown, P. et al., "The Mathematics of Statistical Machine Translation: Parameter Estimation," Computational Linguistics, 19(2), 263-311 (1993).

Dean, J. et al., "MapReduce: Simplified Data Processing on Large Clusters"; OSDI '04: Sixth Symposium on Operating System Design and Implementation, San Francisco, CA [Online] Dec. 6, 2004, pp. 1-13; http://labs.google.com/papers/mapreduce-osdi04.pdf [retrieved Nov. 11, 2008].

Emami, A. et al., "Large Scale Distributed Language Modeling"; IEEE International Conference on Acoustics, Speech and Signal Processing, 2007, ICASSP 2007, Apr. 15, 2007-Apr. 20, 2007; pp. IV-37-IV-40.

Extended European Search Report dated Apr. 7, 2010 in European Patent Application No. 07750990.9 filed Feb. 16, 2007, 13 pages.

Extended European Search Report dated Oct. 21, 2009 for EP 08154211.0, published as 1983445, and entitled "Encoding and Adaptive, Scalable Accessing of Distributed Models" (9 pages).

Gabor et al., Translation memory as a robust example-based translation system, 2004, Citeseer, pp. 82-89.

Google Language Tools, .Copyright 2007, Retrieved from the Internet: http://www.google.com/language.sub.--tools, 4 pages.

Hildebrand, A. et al., "Adaptation of the translation Model for Statistical Machine Translation based on Information Retrieval" Proceedings of EAMT 2005, [Online] May 30, 2005-May 31, 2005; pp. 133-142; http://www.mt-archive.info/EAMT-2005-Hildebrand.pdf [retrieved on Jul. 24, 2009].

(56) References Cited

OTHER PUBLICATIONS

Medlock, B., "A Language Model Approach to Spam Filtering," http://www.benmedlock.co.uk/medlock-03.pdf [accessed on Apr. 1, 2008], 7 pages.

Miller, E. et al., "Performance and Scalability of a Large-Scale N-gram Based Information Retrieval System," Journal of Digital Information vol. 1, No. 5, 25 pages, (Jan. 7, 2000) http://jodi.tamu.edu/Articles/v01/i05/Miller/miller2.pdf [accessed on Apr. 1, 2008].

Och, F. et al., "The Alignment Template Approach to Statistical Machine Translation," Computational Linguistics 30 (4): 417-449 (2004).

Ortmanns, S. et al., "Language-model look-ahead for large vocabulary speech recognition," ICSLP 96: Proceedings of the Fourth International Conference on Spoken Language, Philadelphia, PA, USA: Oct. 3, 1996-Oct. 6, 1996, vol. 4, pp. 2095-2098 (Oct. 6, 1996).

Partial European Search Report dated Aug. 5, 2009 for EP 08154211.0, published as 1983445, and entitled "Encoding and Adaptive, Scalable Accessing of Distributed Models" (7 pages).

PCT International Search Report and Written Opinion dated Feb. 20, 2008 for International Application No. PCT/US07/04196, 14 pages.

Popat, K. et al., "Adding Linguistic Constraints to Document Image Decoding: Comparing the Iterated Complete Path and Stack Algorithms," In Proceedings of IS&T/SPIE Electronic Imaging 2001: Document Recognition and Retrieval VIII, Jan. 2001, 13 pages.

Screenshot of Translated version of http://news.google.ru/, 1 pg., Retrieved from the Internet on Feb. 14, 2007.

Soricut, R. et al., "Using a Large Monolingual Corpus to Improve Translation Accuracy" Machine Translation and the Information Soup. Conference of the Association for Machine Translation in the Americas, Oct. 8, 2002, pp. 155-164.

U.S. Appl. No. 60/774,790, entitled "Encoding and Adaptive, Scalable Accessing of Distributed Models", filed Feb. 17, 2006, 81 pages.

U.S. Appl. No. 60/775,570, entitled "Encoding and Adaptive, Scalable Accessing of Distributed Models", filed Feb. 21, 2006, 85 pages.

Zhang, Y. et al., "Distributed language modeling for N-best list re-ranking"; Proceedings of the 2006 Conference on Empirical Methods in Natural Language Processing, Sydney, Australia, [Online] Jul. 22, 2006; pp. 216-223; http://www.aclweb.org/anthology-new/W/W06/W06-1626.pdf [retrieved on Nov. 12, 2008].

Deng et al. "HMM word and phrase alignment for statistical machine translation," Human Lanague Technology and Empirical Methods in Natural Language Processing, Association for Computational Linguistics, Oct. 6, 2005, 8 pages.

Extended European Search Report issued in International Application No. 12175775.1, dated Jan. 3, 2018, 12 pages.

Partial European Search Report issued in European Application No. 12175757.9, dated Jan. 3, 2018, 16 pages.

Extended European Search Report issued in European Application No. 12175757.9, dated Apr. 6, 2018, 14 pages.

\* cited by examiner

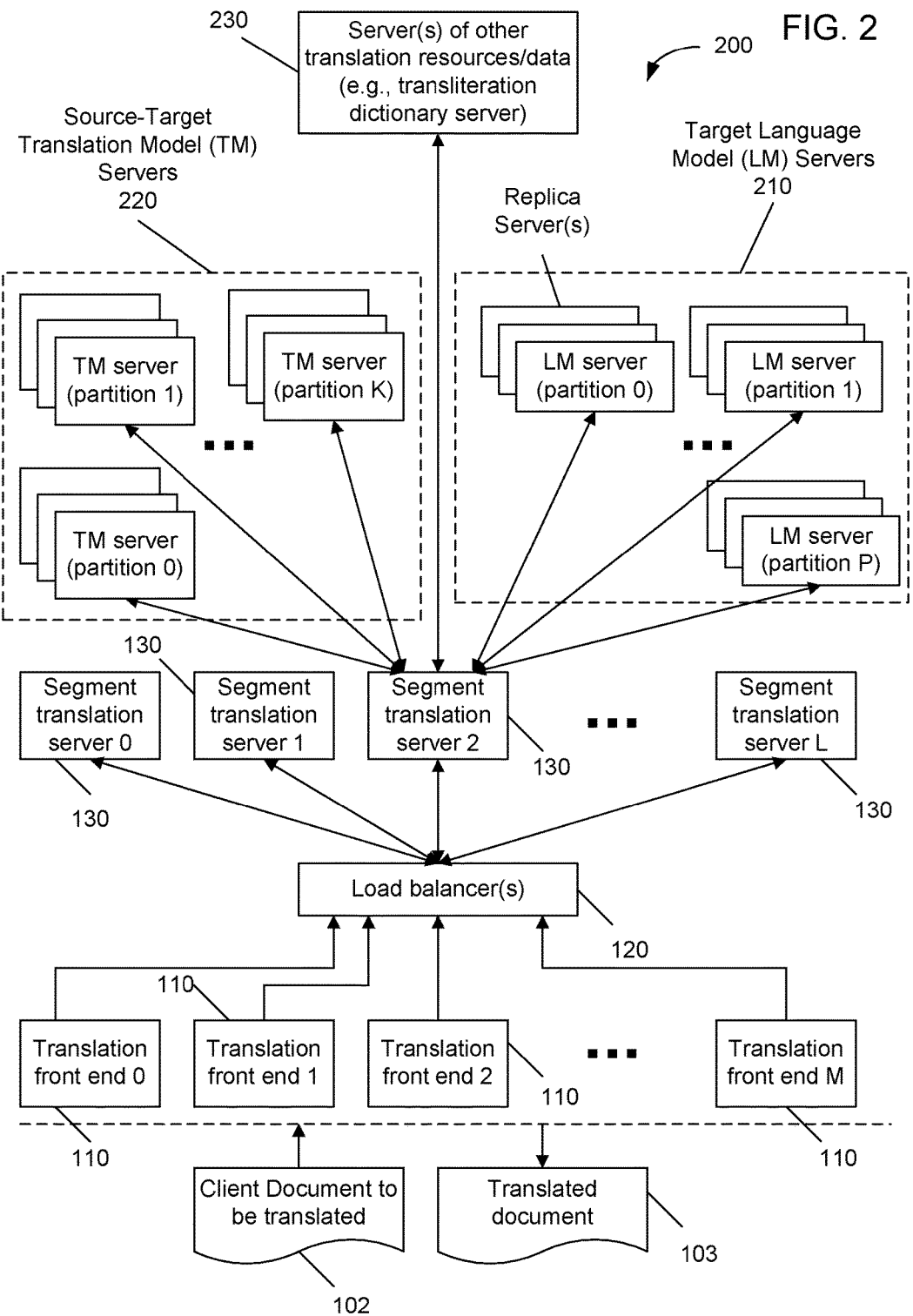

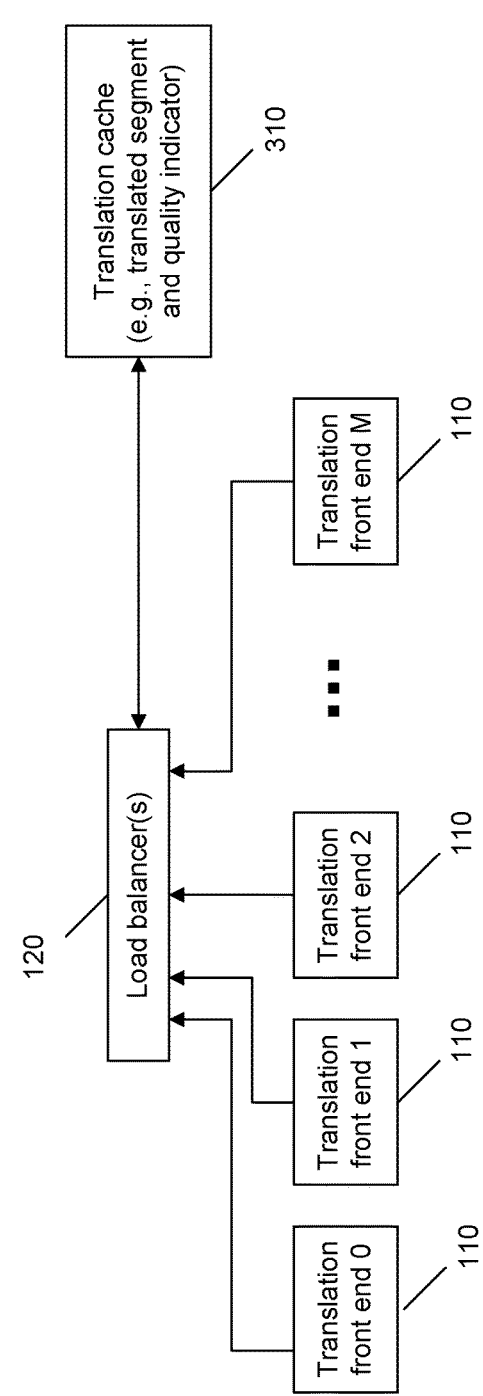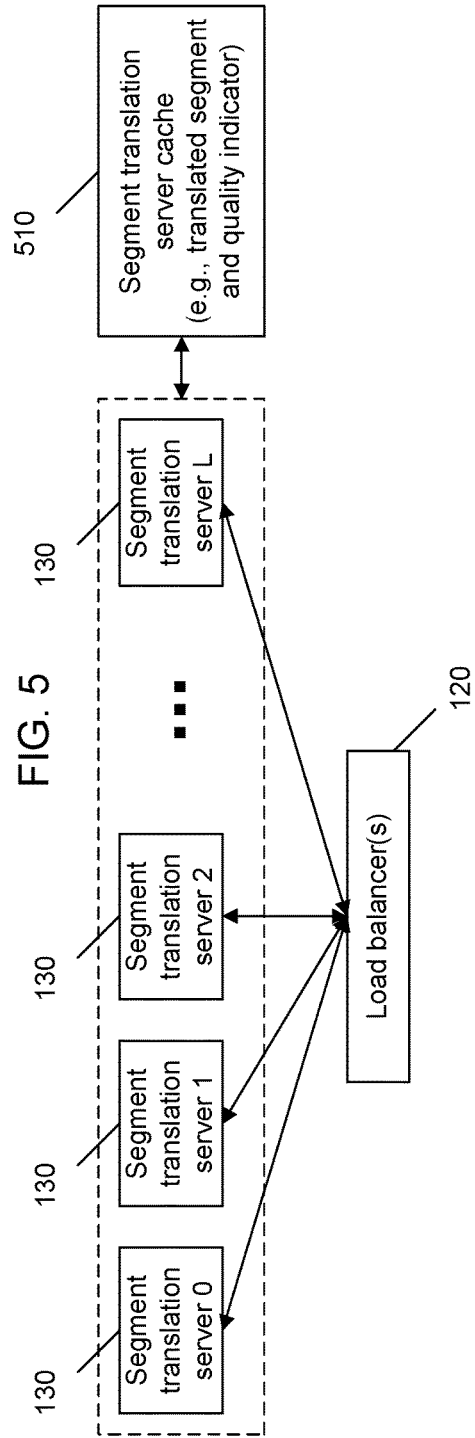

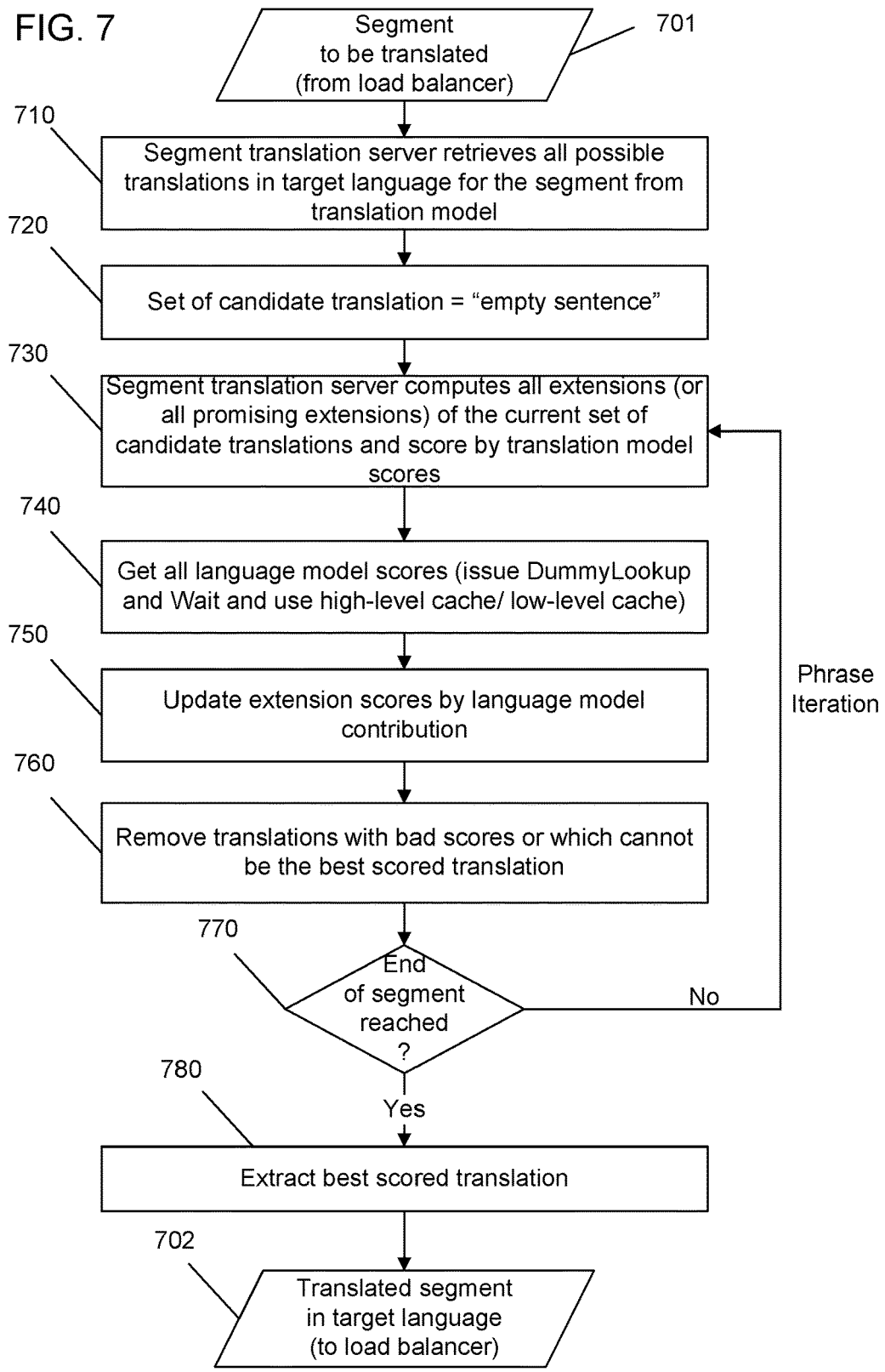

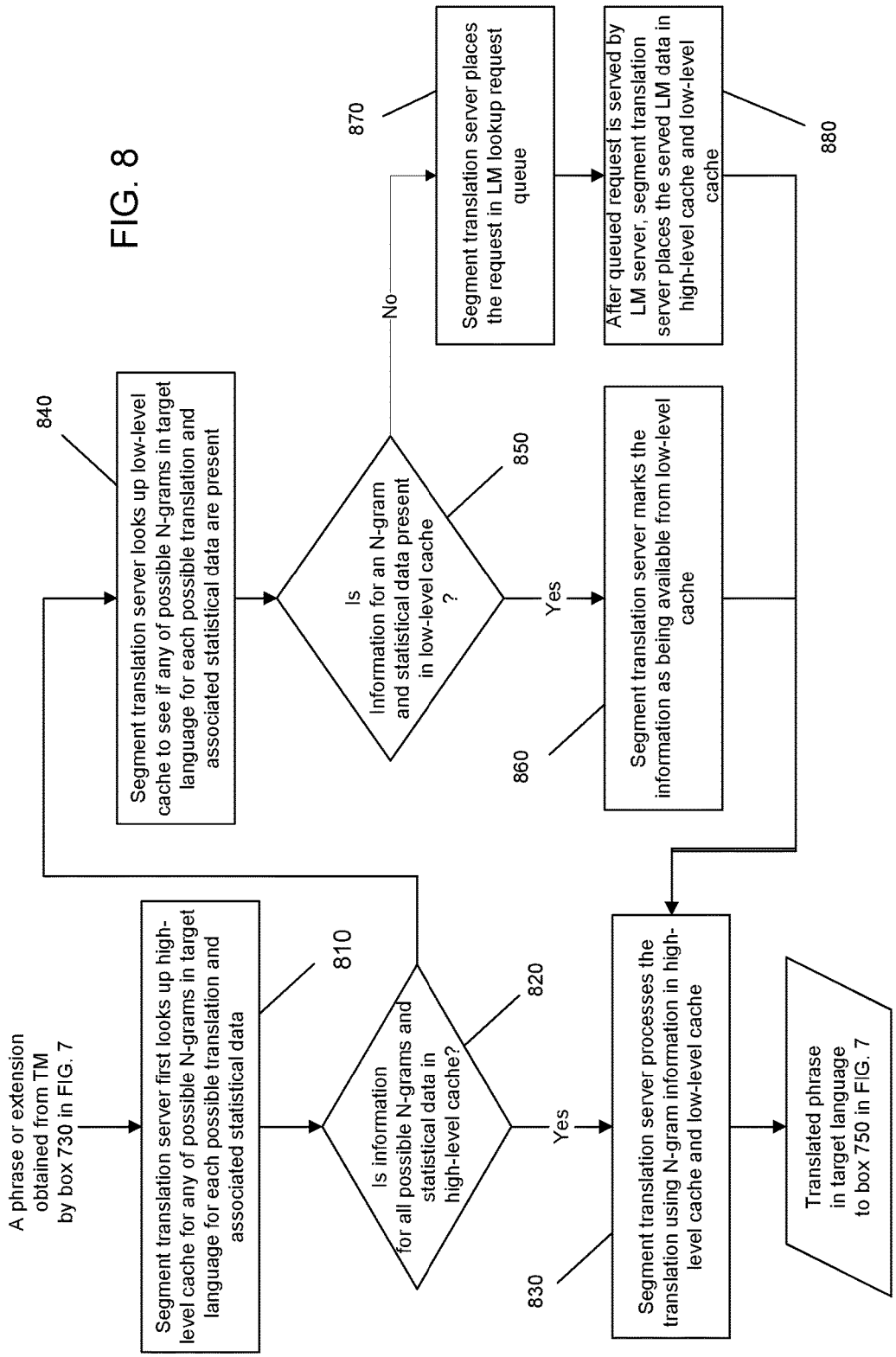

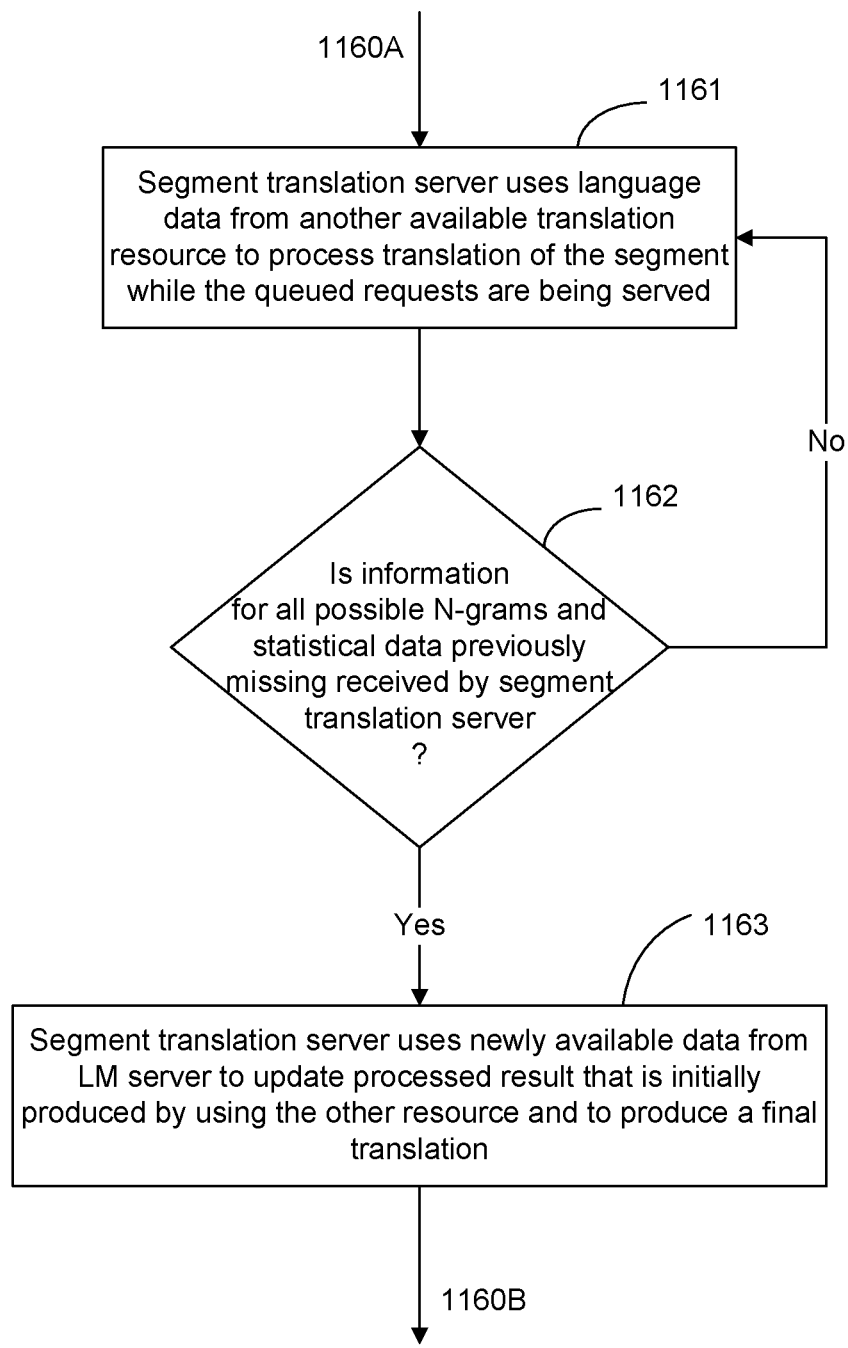

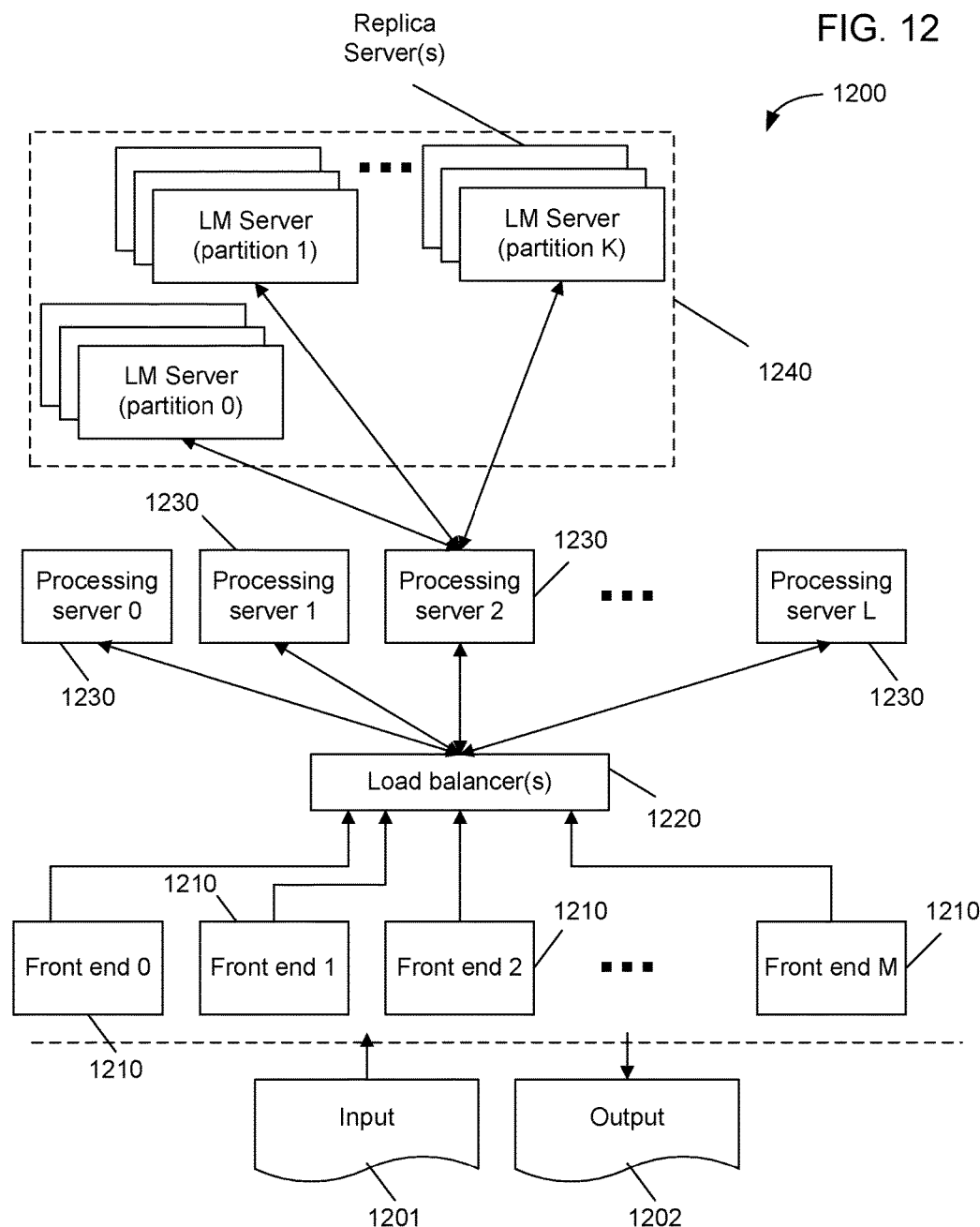

ENCODING AND ADAPTIVE, SCALABLE ACCESSING OF DISTRIBUTED MODELS

CROSS-REFERENCE TO RELATED APPLICATIONS

This application is a continuation of U.S. patent application Ser. No. 14/285,693, filed May 23, 2014, which is a continuation of U.S. patent application Ser. No. 13/657,313, filed Oct. 22, 2012, now U.S. Pat. No. 8,738,357, which is a continuation of U.S. patent application Ser. No. 12/092,820 filed on May 6, 2008, now U.S. Pat. No. 8,296,123, which is a National Stage of PCT International Application No. PCT/US2007/004196 filed on Feb. 16, 2007, which claims the benefit of U.S. Provisional Application No. 60/775,570 filed on Feb. 21, 2006 and U.S. Provisional Application No. 60/774,790 filed on Feb. 17, 2006. The entire disclosures of each of the above applications are incorporated herein by reference.

BACKGROUND

The specification of this application relates to machine processing using machines such as computers to perform processing tasks such as machine translation.

Machines such as computers and computer-based machines are widely used to automate various processing tasks. Certain tasks that were difficult for machine to handle in the past are increasingly being automated due to advances in computer information technology and communication technology. Language translation and speech recognition are two examples of machine processing tasks that are being automated.

Translation from one human language or natural language (a source natural language) to another natural language (a target natural language) can be done in various ways. A person can manually translate a text in the source natural language (e.g., Chinese) by first reading and understanding the Chinese text and then writing down the corresponding text in the target language (e.g., English). Such manual translation tends to be of high quality but can be expensive and slow. Machine translation uses computers and other machines to automate part of or the entire translation process to reduce the translation cost and expedite the translation process. Rule-based machine translation and statistical machine translation are two examples of machine translation techniques. A machine translation system can be easy to use: a user sends a digital document in the source natural language into the machine translation system; the system processes the document and produces a translated document in the target natural language. Machine translation is increasingly used in a wide range of applications. For example, resources are available on many computer networks such as the Internet to provide machine translation to allow for easy access to information in different natural languages.

The translation quality of machine translation systems, however, can be lower than manual translation and, sometimes, a machine-translated text can be difficult or impossible to understand. Various machine translation techniques including statistical machine translation techniques, have been developed to improve different aspects of machine translation, such as the translation quality and the translation speed.

SUMMARY

This specification describes distributed machine processing systems, techniques, methods and apparatus that can be implemented to use resource partition, replication, and load balancing to access large models and to provide scalable and adaptive processing. Various distributed machine processing systems can be constructed based on the described techniques, including machine translation systems, speech recognition systems, spam detection systems, optical character recognition systems, spelling correction systems, entity detection systems, information extraction systems, and others.

In one aspect, a system is described to include computer data servers each storing and operable to serve a partition of a collection of data. The respective partitions together constitute the collection of data and each respective partition is less than the collection of data. This system also includes a processing server operable to obtain data from the data servers and to use the obtained data to process an input and to produce an output. The system can be implemented to include one or more replica data servers for each of the data servers. In one implementation, the collection of data is data for a language model for a target language. The language model includes n grams in the target language and statistical data for each of the n grams. The n grams can include N-grams with N greater than 3. The processing server is a translation server operable to translate a text in a source language in the input into the target language using the obtained data from the language model. The processing server can be implemented in various configurations, e.g., a speech recognition server operable to convert a human speech in the target language in the input into a text in the target language using the obtained data from the language model, a spelling correction server operable to correct a spelling of a word in the target language in the input using the obtained data from the language model, or an optical character recognition server operable to recognize text in a received document image in the input using the obtained data from the language model.

In another aspect, a system for machine translation can include machine translation resource servers, and at least one translation server. Each machine translation resource server stores and is operable to serve a partition of a collection of machine translation resource data for translation from a source language to a target language. The respective partitions together constitute the collection of machine translation resource data and each respective partition is less than the collection of machine translation resource data. The translation server is operable to receive source text in the source language to be translated into the target language, and is further operable to obtain machine translation resource data from the machine translation resource servers and to use the obtained machine translation resource data to translate the source text into the target language.

In another aspect, a system for machine translation can include a translation server operable to perform machine translation obtaining translation model data from a translation model for translation between a source language and a target language and language model data from a language model for the target language. The translation server is further operable to translate text in the source language into the target language using the obtained translation model data and language model data. The translation server includes a request queue operable to store requests for language model data to be obtained for translating a segment in the source language, and a segment translation server cache operable to store language model data obtained by the requests by the translation server.

In another aspect, a method for machine translation can divide a collection of machine language translation resource data for translation from a source language to a target language into partitions each being less than the collection of machine language translation resource data. The partitions are stored on different computer servers, respectively. A machine translation server is operated to access and use the collection of machine language translation resource data on the different computer servers to perform translation from the source language into the target language.

In another aspect, a method is described for machine translation of text from a source language into a target language using a translation model for translation between the source language and the target language and a language model for the target language. This method includes: partitioning the translation model into partitions of different data, wherein each translation model partition is less than the translation model; storing the translation model partitions on different translation model servers; partitioning the language model into language model partitions of different data, wherein each language model partition is less than the language model; storing language model partitions on different language model servers; monitoring work load of translation severs each operable to translate text in the source language into the target language using the translation model and the language model; distributing segments of a text to be translated from the source language into the target language to one or more selected translation servers from translation servers based on the work load; operating each selected translation server to access the translation model severs and the language model servers to fetch desired translation model data and language model data for each respective segment to be translated; and compiling translated segments from the selected translation servers to produce a translated text.

In another aspect, a computer implemented method can include receiving a client document in a source language to be translated into a target language; dividing the client document into segments to translate each segment; and accessing at least one of different language model servers. The different language model servers collectively store a language model for the target language to retrieve selected language model data related to translation one of the segments. Each language model server stores and is operable to serve a partition of the language model. This method also includes translating the segment into the target language using the retrieved selected language model data.

In another aspect, a method for machine translation can include using a machine translation system to receive text in a source language from a client and to translate the text into a target language. The translating in the machine translation system includes: selecting a portion of the text to translate at a low translation quality to produce an initial translated portion while translating the selected portion at a high translation quality; delivering the initial translated portion to the client while continuing translating the selected portion at the high translation quality; and after the selected portion is translated into a second translated portion at the high translation quality, delivering the second translated portion at the high translation quality to the client to automatically replace the initial translated portion.

In another aspect, a system for machine translation can include language model servers, a translation model server, and a translation server. Each language model server stores and is operable to serve a partition of a language model for a target language. The respective partitions together constitute the entire language model. The translation model server stores and is operable to serve a translation model for translation between the target language and a source language. The translation server is operable to obtain translation model data from the translation model server and language model data from the language model servers and translate a source text in the source language into the target language based on obtained translation model data and language model data.

In another aspect, a system for machine translation can include a translation server module and a translation cache. The translation server module is operable to obtain translation model data from a translation model for translation between a source language and a target language and language model data from a language model for the target language. The translation server module is further operable to translate text in the source language into the target language using the obtained translation model data and language model data. The translation cache stores translations of selected tokens and segments. Each segment includes a combination of tokens from the source language to the target language. The translation server module is operable to look up the translation cache for a suitable translation for a segment to be translated and, when the suitable translation is present, to retrieve the suitable translation without further processing the segment and without obtaining translation model data and language model data for translating the segment.

In another aspect, a method for operating a machine translation system can include: dividing a source text to be translated from a source language into a target language into segments; looking up each of the segments in a translation cache storing translations of selected tokens and segments each comprising a combination of tokens from the source language to the target language; when a suitable translation for a segment to be translated is in the translation cache, using the suitable translation for the segment without further processing the segment; when a suitable translation for a segment to be translated is not in the translation cache, operating a translation server to access a translation model for translation between the source language the target language and a language model for the target language to obtain desired translation model data and language model data for translating the segment; and operating the translation server to translate the segment using the desired translation model data and language model data.

In yet another aspect, a segment translation device for machine translation can include a decoder operable to translate a segment, which includes one or more tokens in a source language, into a translated segment in a target language using a translation model for translation between the source language and the target language and a language model for the target language. A segment translation server cache is included in this device to store data retrieved from the language model for translating the segment and to serve the stored data to the decoder. The decoder is operable to communicate with language model servers, which respectively store different partitions of the entire language model, to request for information on each of N grams for possible translations of the segment and associated statistical data.

The disclosed and other embodiments can be implemented as one or more computer program products, i.e., one or more modules of computer program instructions encoded on a computer readable medium for execution by, or to control the operation of, data processing apparatus. Particular embodiments can be implemented to realize one or more advantages, such as enhanced quality of machine translation, improved translation speed, scalability of the system, and the capacity for handling a large volume of requests for machine translation. The details of one or more embodiments of the described systems, techniques and apparatus are set forth in the accompanying drawings and the description below. Other features, aspects, and advantages associated with the described systems, techniques and apparatus will become apparent from the description, the drawings, and the claims.

DRAWINGS

FIG. 2 shows one implementation of the distributed machine translation system 100 in FIG. 1.

FIG. 4 shows an example of a translation cache that can be connected to a load balancer.

FIG. 5 shows an example of a segment translation server cache that can be shared by the segment translation servers.

FIG. 7 illustrates one exemplary operation of a translation decoder.

FIG. 8 shows an example of a processing step of a translation decoder.

FIGS. 11A and 11B show another example processing flow of a segment translation server.

FIG. 12 shows an example of a distributed processing system that can be configured to provide a language processing function based on a large language model.

Like reference numbers and designations in the various drawings indicate like elements.

DETAILED DESCRIPTION

Figure 1:
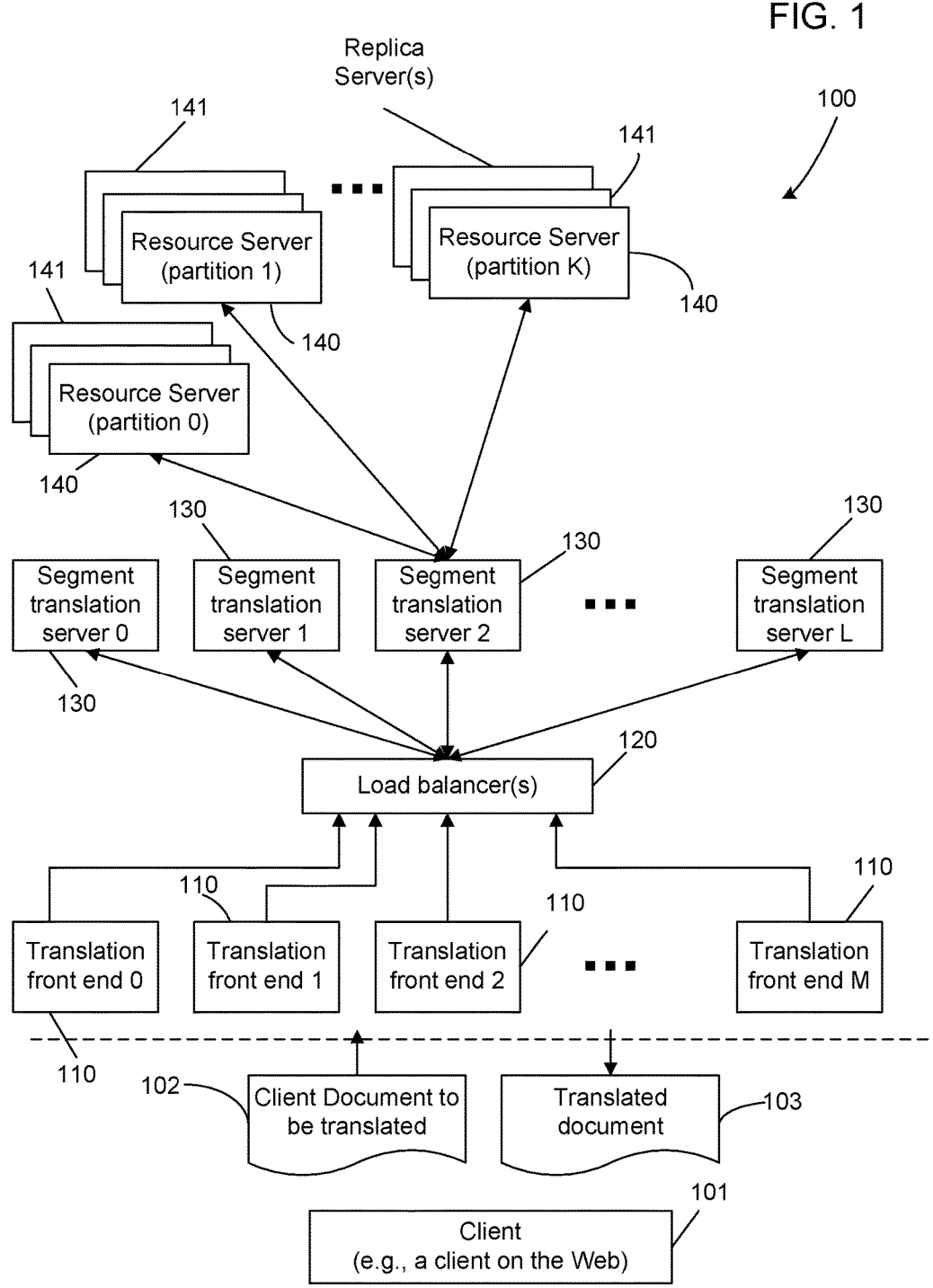
FIG. 1 shows a distributed machine translation (DMT) system 100 to illustrate with specific examples the partition, replication and load balancing that can be realized using the distributed machine processing techniques described in this specification.

Automated machine processing techniques and systems described in this specification can be implemented to operate with a large volume of resources to improve the processing performance, e.g., the quality and speed of the processing. Examples of automated machine processing includes machine translation, speech recognition, spam detection, optical character recognition, spelling correction, entity detection, and information extraction. The described automated machine processing techniques and systems can also be implemented with sufficient processing capacity to respond to a large volume of requests for automated processing. In these and other implementations of automated processing, a distributed design can be used to implement the system resources or the system processing capacity.

Partition and replication are two examples of techniques available for implementing the distributed design.

In partition, a particular item within an automated processing system is divided or partitioned into different partitions that are physically located on different machines, e.g., computers. Each partition is less than the entire item and different partitions can be different from one another in some implementations and can have some degree of overlap in other implementations. For example, a database server that primarily stores data or a processing server that primarily executes one or more processing tasks in the automated processing system can be an item that is partitioned. Partition allows a large item to be implemented in the system without being limited to the capacity of a single machine. Different partitions are placed on different machines and thus can be accessed separately. Therefore, among other beneficial features, partitions can be used to handle high load and allow for scalability and reliability. The scale and other features of a partition will vary depending on the requirements and restraints in a particular automated processing system. A large database, for example, may be difficult to store in a single machine (e.g., a database server) or it may not be economical to use a single expensive machine to store the large database. Accordingly, the large database may be partitioned into a number of smaller database partitions so that each of a number of selected machines has a sufficient storage to store each database partition. Different machines may be networked to operate as a "virtual" single database to a client accessing the database. Similarly, a processing server may also be partitioned into different partitioned processing servers where each partitioned processing server provides a portion of the processing function of the original processing server and different partitioned processing servers are designed to partition mostly different processing functions.

Replication is another technique for the distributed design and is different from partition. In replication, a particular item within such a system, e.g., a database server or a processing server, is duplicated or cloned onto one or more replica machines such as computers. Each replica may be substantially identical to the item being replicated in function and other aspects. Replication can be used to increase the availability or the capacity for a function of the item being replicated, reduce the latency or delay in accessing a function of the item being replicated, and provide redundancy for a function of the item. Because a single item usually has a limited capacity, replication makes the function of the item being replicated available to multiple requests from clients when, e.g., such requests are made at the same time, or processing and serving of the different requests overlap in time. In a system with the redundancy of replication, if one machine for a replicated item fails, one or more other replicated machines for the item can be made available to replace the failed machine and thus reduce the effect caused by the machine failure to the system. Notably, the scale and other features of a replication will vary depending on the requirements and restraints in a particular automated processing system. A highly used database, for example, may be replicated on different database servers. As another example, a processing server may be replicated into one or more replica processing servers that can operate in parallel with one another. Like partition, replication may be implemented to be invisible to a client accessing the system, because different machines that replicate the same processing server may be networked to operate as a "virtual" single processing server to the client accessing the database.

A replication design, when implemented, can incorporate a load balancing mechanism to monitor the work load of different machines for the replication and, based on the work load, to manage or distribute incoming work load to different machines. This load balancing mechanism can be implemented with different load balancing policies depending on the requirements and constraints of the specific automated processing system. As an example, the load balancing mechanism may be implemented to reduce the delay in accessing a particular function or a piece of information in the replicated part of the system by directing new requests to a replicated machine operating under a light load.

The load balancing mechanism may be extended to managing operations of different machines that are not exactly replicas of one another as described above. For example, servers storing different language models may also be managed by a load balancing mechanism. For another example, several processing servers, such as machine translation servers, may operate based on different language translation resources using the same machine translation scheme, e.g., all are statistical machine translation (SMT) servers. Some SMT servers may produce high-quality translations at slow speeds while others may produce low-quality translations at high speeds. A load balancing mechanism may be implemented to control the translation tasks of different segments of a client document or different client documents based on one or more considerations, such as the quality and timing requirements and constraints. In this example, the load balancing mechanism, although its name still suggesting some "load" balancing operations, does balance something that is not necessarily the work load of different machines. The term "load balancing" as used in this specification, therefore, is not limited to balancing load. Rather, the terms "load balancing mechanism," "load balancer," and "load balancing module," and "load balancing server" are generally used to indicate a balancing mechanism that manages and distributes communication traffic, requests or tasks on different machines while balancing certain considerations associated with the operations and conditions of the machines, the nature of the requests or tasks, and operations and conditions of other parts of the system.

In some implementations, a load balancing mechanism is implemented as a component attached to or in communication with a machine that is primarily designed for a function different from the load balancing mechanism, or as an individual machine in situations where the balancing mechanism may be handling high traffic to some machines. In addition, the partition and replication for the distributed machine processing of this specification can apply to the load balancing mechanism, when needed, with different machines so that the load balancing mechanism is partitioned into, or replicated on, the different machines.

Partition, replication and load balancing can be used individually or in combination to build, operate, and manage distributed machine processing in an adaptive, dynamic, efficient, fault-tolerant and scalable manner in response to specific requirements and constraints of a particular system or an operation or condition of the system. As one example, distributed machine processing based on partition, replication, load balancing mechanism and other mechanisms can be configured and implemented to address various issues in automated processing in challenging, volatile, and dynamic computer network environments. More specifically, the automated machine processing techniques and systems in this specification can be used for various on-line machine processing such as machine translation, speech recognition, spam detection, optical character recognition, spelling correction, and others.

The following specific implementations of distributed machine processing use machine translation as an example for automated machine processing to illustrate various techniques, devices, designs, and controls in distributed machine processing.

In some implementations, a machine translation system based on the distributed machine processing includes machine translation resource servers and at least one translation server. Each machine translation resource server stores and is operable to serve a partition of a collection of machine translation resource data for translation from a source natural language to a target natural language. The respective partitions together constitute the collection of machine translation resource data, and each respective partition is less than the entire collection of machine translation resource data. The translation server is operable to receive source text in the source language to be translated into the target language and is further operable to obtain machine translation resource data from the machine translation resource servers. The translation server then uses the obtained machine translation resource data to translate the source text into the target language.

As an example of such implementations, FIG. 1 shows a distributed machine translation (DMT) system 100. Multiple translation front ends 110, which may be computer servers, are arranged logically in parallel with one another and are used to receive with client requests for translating client documents 102 and deliver translated documents 103 to clients 101. A client 101 may be connected to the DMT system 100 over a computer network such as the Internet. The DMT system 100 includes segment translation servers 130 that retrieve translation resource data from translation resource servers 140 and use the retrieved data to perform translation tasks. A load balancer server 120 is connected between the segment translation servers 130 and the translation front ends 110 to monitor, manage and control exchanges and traffic between the translation front ends 110 and the segment translation servers 130 and operations of the translation front ends 110 and the segment translation servers 130. The load balancer server 120 can be replicated on one or more replica load balancer servers. The servers 130, 120 and 110 collectively form a translation server that performs translation of a client document 102 by using the translation resource data on translation resource servers 140 and their replicas 141.

The translation front ends 110 are replicas of one another and operate in parallel with one another. The segment translation servers 130 are also replicas of one another and operate in parallel. The resource servers 140 are partition servers that store partitions of the entire translation resource data and other resources and information for the segment translation servers 130 to perform the translation tasks. Each resource server 140 is shown to have one or more replica resource servers 141. The translation resource data and other resources and information in the resource servers 140 may include one or more language models for one or more different target natural languages, one or more translation models for translations between one or more different source natural languages and one or more different target natural languages, one or more transliteration dictionaries between one or more source natural languages and one or more target natural languages, and other dictionaries. Segment translation servers 130 can implement the same or different machine translation decoding schemes, such as rule-based MT and statistical MT decoders.

In operation, each translation front end 110 receives a client document 102 to be translated by the system 100 and, after receiving the translated client document 103 from the back end of the system 100, sends the translated client document 103 to the client 101. Upon receiving a client document 102, a receiving translation front end 110 divides the client document 102 into multiple smaller segments where each segment includes one or more tokens. One example of a segment is a sentence within a paragraph. The content of a segment may vary in different implementations and may range from a few words to multiple sentences. The translation front end 110 may direct all segments to the load balancer 120 for distribution to the segment translation servers 130 and a segment translation server 130 processes an assigned segment and translates the assigned segment by using desired translation resource data from one or more resource servers 140. Each translated segment is then sent back to the original requesting translation front end 110 via the load balancer 120. After receiving all translated segments back, the original requesting translation front end 110 assembles the translated segments into a translated client document 103 and sends the translated client document 103 to the client 101. In some implementations, the translation front end 110 may first determine whether a proper translation for a segment is available in the system 100 and retrieves that translation as the translated segment without sending that segment to the load balancer 120. This alternative may be implemented by using a translation cache and is described in detail in later sections of this specification.

The DMT system 100 has replica servers 141 for each partition resource server 140. Hence, an additional load balancing mechanism that is different from the load balancer 120 may be implemented between the resource servers 140 and 141 and segment translation servers 130 as a back end load balancing mechanism. In some implementations of this back end load balancing mechanism, each segment translation server 130 can include a segment load balancer as part of the server to control, manage, distribute the requests from that segment translation server 130 to the resource servers 140 and 141. The entire segment load balancers together constitute the back end load balancing mechanism. Each segment load balancer can be a separate machine in some implementations and may be replicated or partitioned if needed.

Each load balancing mechanism, e.g., the front end load balancer 120 and the back end load balancing mechanism, can include a monitoring mechanism to monitor activities, conditions and operations of various machines involved in the operations of that load balancing mechanism. This may be implemented in various ways. For example, a communication protocol may be used to provide monitoring communications between the load balancing mechanism and each machine under monitoring.

FIG. 2 shows one implementation 200 of the distributed machine translation system 100 of FIG. 1. This system 200 uses a statistical machine translation (SMT) technique to perform translation from a source natural language into a target natural language based on a source-target translation model and a target language model. The source language and the target language may be two different natural languages such as Chinese and English in many translation applications. In some applications, the source language and the target language may be two different writing formats or expressions of the same natural language, e.g., the simplified Chinese and the traditional Chinese. Computer servers 210 are used to store the target language model and computer servers 220 are used to store the source-target translation model. In some implementations, a single translation model server 210 may be sufficient to store and serve the entire translation model. Servers 210 and 220 in the system 200 are examples of the resource servers 140 and 141 of the system 100 of FIG. 1 and the translation and language models are examples of the machine translation resource data in the system 100 in FIG. 1. SMT decoders can be implemented in at least some of the segment translation servers 130 to perform the translation of each segment using the translation and language models in servers 210 and 220.

In this system 200, the translation model includes mapping information between the source language and the target language and scoring information associated with each mapping. The mapping information can include a relation between (1) one or more tokens in the source language and (2) one or more tokens in the target language. In one implementation, for example, the mapping information between the source language and the target language is all possible pairs of language strings between the target and source languages. The scoring information can include statistical data for each mapping between the source language and the target language, such as a probability of a pair of language strings between the target and source languages. Other statistical data may also be used as part of the scoring information. The language model includes a collection of possible language strings in the target language and corresponding language model scoring information for each string. A string includes one or more language tokens. A token is the smallest language unit handled by the system. Each string is an n-gram, which is a sequence of n tokens in the target language, where n is a positive integer. Various tokenization techniques may be used to construct a tokens from one or more of symbols and marks, including diacritical marks and punctuation marks, letters, and character in a language. The language model scoring information can include statistical data for each string or n-gram in the language model. The statistical data may include information related to a respective frequency of occurrence of each of the respective n grams in a corpus of target language text, such as a probability, a smoothed probability, or a smoothing coefficient that is related to a respective frequency of occurrence of each of the respective n grams in a corpus of target language text. The language model scoring information can also include information other than statistical data.

In operation, a SMT decoder in a segment translation server 130, after receiving a segment to decode, first retrieves needed information from the translation model in servers 220 and then requests needed data from the language model 210 based on the information from the translation model. The SMT decoder computes statistics on all possible translations from various arrangements of tokens in the target language and searches for the best translation. The respective segment translation server 130 sends the translation output from the SMT decoder to the originating translation front end server 110 through the load balancer 120.

The translation quality of a statistical machine translation (SMT) system can generally be improved by increasing the size of either or both of the translation model (TM) and the language model (LM) of the system. Hence, the system 200 may have large translation and language models that need partition in practical implementations in part due to the limited storage capacity in a single machine. As an example, large language models for English can be derived from about 200 billion words to 8 trillion words and are from about 1 Terabyte to 4 Terabytes in size. A large TM may be on the order of magnitude of 200 million words or larger. As more documents are made available on line, the LM may increase further in size. Hence, partition provides an effective approach to high-quality MT systems using the distributed machine processing. Replication and load balancing can also be used in such DMT systems and other MT systems based on large language and translation models.

The language model servers 210 include multiple partition servers that store and serve different partitions of the language model. An example of (P+1) partitions are shown in FIG. 2, where P is an integer. Each partition server stores and is operable to serve a partition of a language model for the target language and the respective partitions on these partition servers together constitute the entire language model. Each respective partition server can include all n-grams in the language model satisfying a partitioning criterion. For example, each respective partition server can store and serve a partition that includes all n-grams in the language model having a common token in a predetermined position. For another example, each respective partition server can store and serve all n-grams in the language model having common tokens, which may be at predetermined positions in each n-gram or may be the last two tokens in a sequence of n tokens. A token in n-grams can be either a text word of the target language or a symbol in the target language. In addition, each language model partition can be replicated on one or more other replica servers, as shown in FIG. 2.

Similarly, the translation model servers 220 include multiple partition servers that store and serve different partitions of the translation model. An example of (K+1) partitions are shown in FIG. 2, where K is an integer. The respective partition servers together constitute the entire translation model, and each respective partition is less than the whole of the translation model. In addition, each translation model partition can be replicated on one or more other replica servers, as shown in FIG. 2.

Figure 11A:
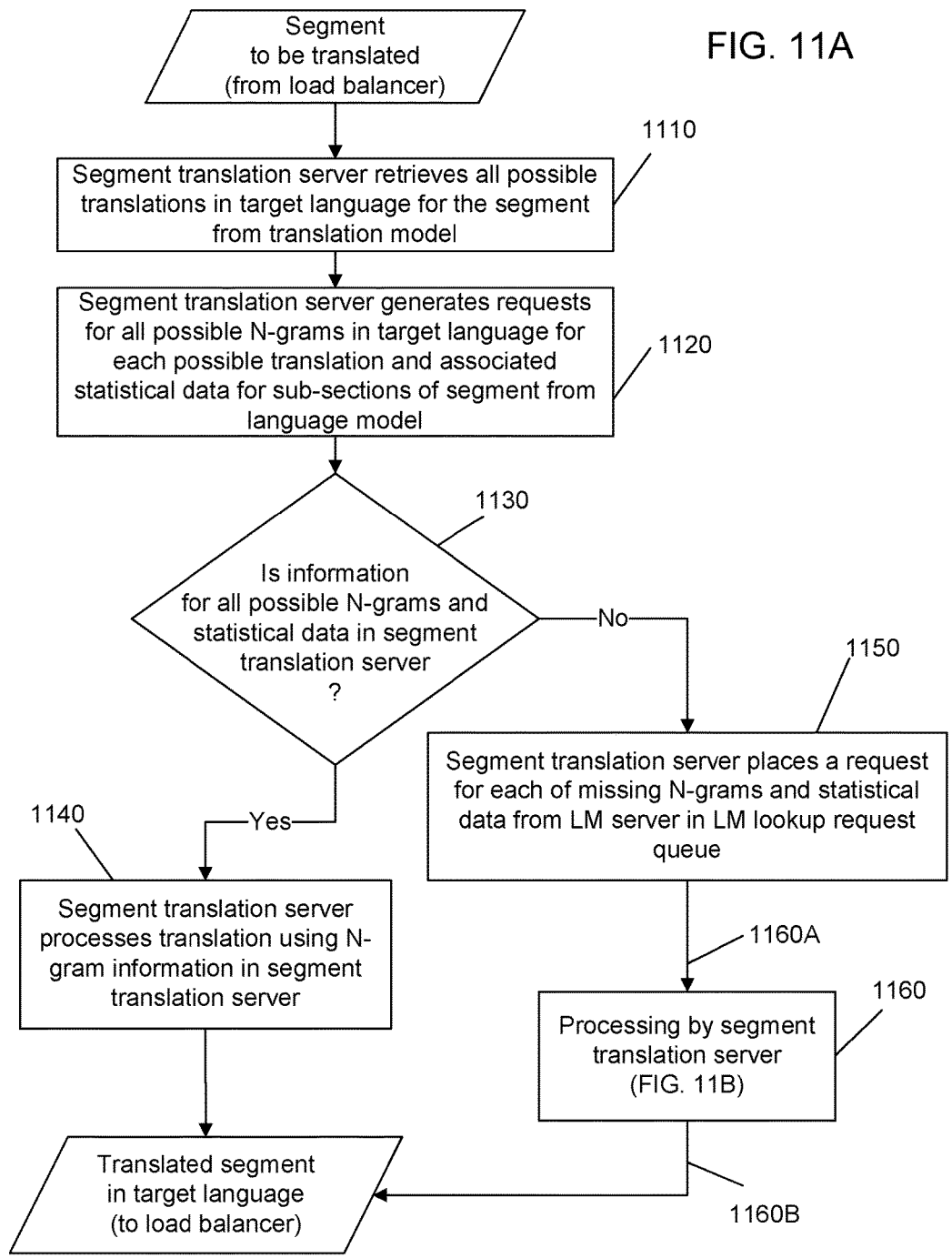

FIG. 2 further shows one or more servers 230 for other translation resources and data in addition to the LM and TM servers 210 and 220. This feature may be an optional feature to further improve various properties of the system 200. For example, one of the segment translation servers 130 may be designed to use other translation resources and data in the servers 230 for translating a segment with or without the SMT processing based on the language and translation models. The implementation shown in FIGS. 11A and 11B is one such example where the translation using the other resources and data is combined with translation with the SMT processing with the language and translation models. Examples for the one or more servers 230 for other translation resources and data include a transliteration dictionary server between the target and source languages, a rule-based machine translation server, a transliteration processing server implementing a rule-based algorithm to produce transliteration data, and other resources to aid translation from the source language to the target language.

The system 200 is one example of a MT system using language and translation models. This type of system can include language model servers, at least one translation model server serving a translation model, and a translation server operable to receive source text in the source language to be translated into the target language. Each language model server stores and is operable to serve a partition of a language model for the target natural language and the respective partitions together constitute the entire language model. The translation server is operable to perform machine translation, obtaining translation model data from the translation model server and obtaining language model data from language model servers.

As a specific example for this type of systems as shown in FIG. 2, a MT system using the language and translation models can include language model servers 210 respectively storing and operable to serve different partitions of a language model for a particular target language. The respective partitions together constitute the entire language model and each respective partition is less than the whole of the language model. One or more replica language model servers can be included for each of the language model servers 210. This system can also include translation model servers 220 respectively storing and operable to serve different partitions of a translation model for translation between the target language and a source language. The respective partitions together constitute the entire translation model and each respective partition is less than the whole of the translation model. One or more replica translation model servers can be included for each of the translation model servers 220. Translation front ends 110 can be provided in the system 200 to interface with clients and each translation front end 110 is operable to divide source text into segments. This system can include segment translation servers 130 each operable to perform machine translation, obtaining translation model data from the translation model servers 220 and the replica translation model servers and obtaining language model data from language model servers 210 and the replica language model servers. A load balancing module 120 can also be included and is operable to, based on translation load at the segment translation servers 130, selectively assign the segments to one or more of the segment translation servers 130 for translation.

The system 200 in FIG. 2 may also include resources to provide automated translation between the target language and a second source language. One or more translation model servers can be included in the system 200 for a second translation model for translation between the target language and the second source language. Accordingly, multiple second translation front ends are included and each is operable to divide a second source text into segments in the second source language; multiple second segment translation servers are provided that each perform machine translation of assigned segments in the second source language. A second load balancing module is also included to assign the segments to one or more of the second segment translation servers for translation based on translation load at the second segment translation servers. The language model servers 210 for storing and serving the target language model can be shared by the segment translation servers 130 for translating the source language and the second segment translation servers for translating the second source language.

In the above illustrated systems in FIGS. 1 and 2, each segment to be translated is directed from the front end (a translation front end server 110) of the system to the back end for translation by a segment translation server 130 and is then directed by back end to the front end again. This process involves processing by the load balancer 120, accessing servers 210 and 220 by the segment translation server 130 and performing the translation by the segment translation server 130, and routing the translated segment back to the front end server 110. This process takes time and uses resources in the system. For segments that are frequently translated, the respective translations may be stored in a memory unit such as a translation cache accessible by the translation front ends 110 so that the routine process for translating such a segment in the back end of the system can be avoided. In operation, after a client document 102 is segmented at a translation front end 110, the translation front end 110 first looks up the stored transitions in the translation cache and only sends segments without a translation in the translation cache to the back end for translation. This use of the translation cache frees up the system resources, reduces traffic between the front and back ends of the MT system, and can be beneficial to MT systems serving a large volume of translation requests, such as a MT system for a popular website.

Figure 3A:
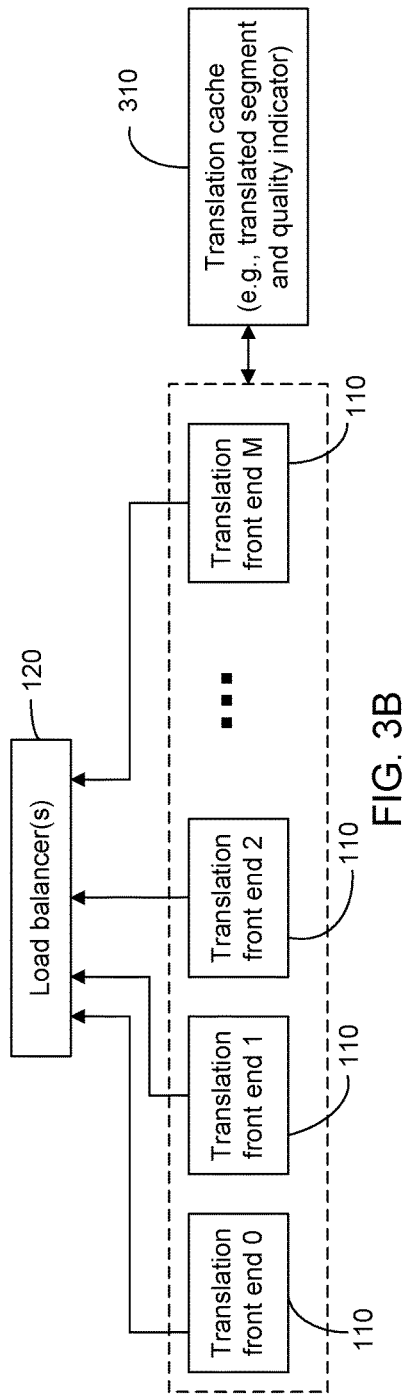
FIG. 3A shows a translation cache that can be connected to and shared by translation front ends in a system of the kind shown in FIG. 1 or 2.
Figure 3B:
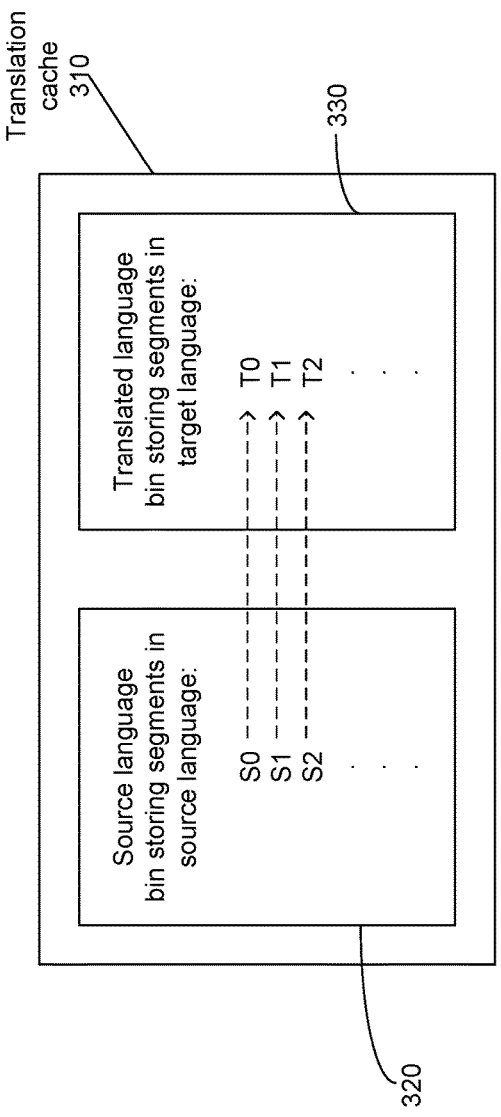
FIG. 3B shows an example of a data structure that can be used in a translation cache.
Figure 3C:
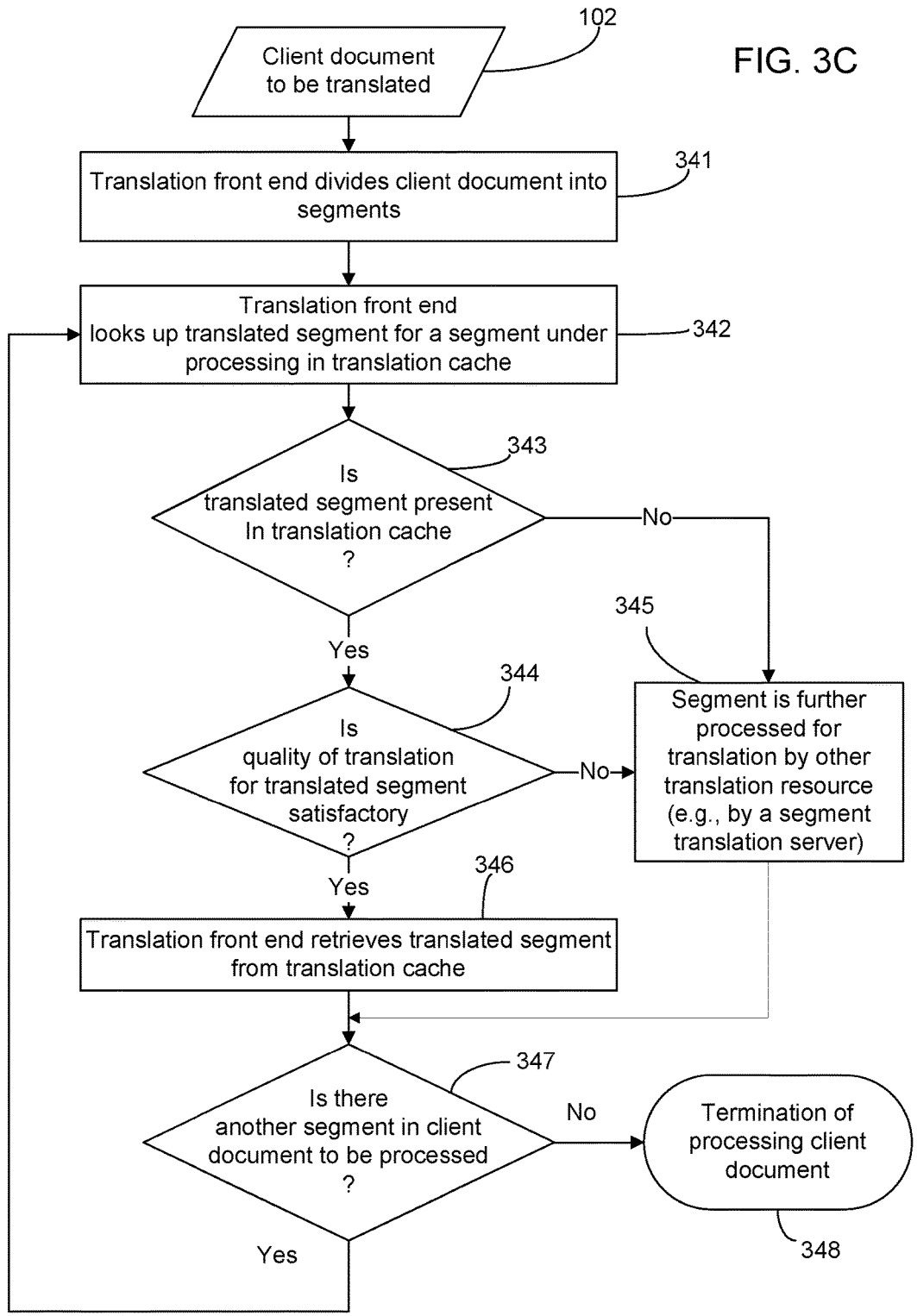
FIG. 3C shows an example method for the operation of a translation cache.

FIGS. 3A, 3B and 3C show features of an example implementation of a translation cache. The translation cache 310 stores translations of selected segments and may also store translations of tokens and strings of tokens such as phrases that are smaller than segments but bigger than tokens. FIG. 3A shows a translation cache 310 that is connected to and shared by the translation front ends 110 in a system of FIG. 1 or 2. The translations in the translation cache 310 can be used to provide a translation for a segment without going through the routine machine translation process at the segment translation server and the load balancing process. Hence, the translation cache 310 may be implemented to reduce the translation latency, free up the translation resource, and expedite the translation process. The translation cache 310 may be partitioned or replicated like resources such as language model and translation model servers. The translation cache 310 may store translations of different categories, e.g., human translations and machine translations.

FIG. 3B shows a data structure that can be used in the translation cache 310. One or more source language bins 320 store segments (S0, S1, S2, etc.) in the source language and one or more target language bins 330 store translated segments (T0, T1, T2, etc.) in the target language. The segment in the source language and the corresponding translated segment in the target language are linked for lookup and access. The translation cache 310 can further include other information associated with each cached translation, such as the information on the quality of a stored translation, a time stamp of the translation, the count of the number of times the translation has been used, the time when the translation was last used, and others. Such information may be used to determine whether a particular translation is a suitable translation to be used for the segment to be translated. The quality information in the translation cache, for example, may be used to select a suitable translation with a desired quality level. A low quality but readily available translated segment may be used to provide an initial translation that is later updated with a high-quality translation in some applications. The translation cache 310 may also include the information on the context in which a translation appears in a document. For example, the context information for a translated segment may include tokens, phrases, or segments at both sides of the translated segments. Such context information can help the system to determine whether that particular translation is a suitable translation based on the likely meaning of the translation within the context. The context information may also include the context for the segment in the source language.

FIG. 3C shows an example method for the operation of the translation cache 310. This example uses the quality information as the selection parameter to illustrate the operation. One or more other parameters, e.g., the context information, may also be used to select the suitable translation for a segment. The translation front end 110 receives a client document 102 to be translated from the source language into the target language and divides the source text in the document 102 into segments (step 341). Next, the translation front end 110 looks up each of the divided segments in a translation cache to determine whether a translation exists (steps 342 and 343). The translation cache 310 stores translations of selected tokens and segments from the source language to the target language. For an existing translation in the translation cache 310, the translation front end 110 also determines whether the quality of the translation is satisfactory (step 344). This can be done, for example, by using the quality information stored in the translation cache 310. When a suitable translation for a segment to be translated is in the translation cache 310, the translation front end 110 uses the suitable translation for the segment without further processing the segment (step 346). When a suitable translation for a segment to be translated is not in the translation cache 310, that segment is then further processed and translated (step 345). This further processing can be achieved by, e.g., using a segment translation server 130 to access a translation model for translation between the source language the target language and a language model for the target language to obtain desired translation model data and language model data for translating the segment, and translate the segment using the desired translation model data and language model data. After completing one segment, the translation front end 110 moves on to the next segment to be processed until all of the divided segments are processed (steps 347 and 348).

FIG. 4 shows a different implementation of the translation cache 310. Different from the design in FIG. 3A, in the design of FIG. 4, the interaction of the translation cache 310 is with the load balancer 120. In operation, after the load balancer 120 receives segments from the translation front ends 110 for translation, the load balancer 120 first looks in the translation cache 310 for a suitable existing translation for each received segment before distributing any received segments to the segment translation servers 130. When a suitable existing translation is found in the translation cache 310 for a particular segment, the load balancer 120 retrieves that existing translation from the translation cache 310 and sends it to the respective originating translation front end 110, without sending that segment to the segment translation servers 130 for translation. If there is no corresponding translation for the segment in the translation cache 310, the load balancer 120 sends the segment to a selected translation server 130 for translation. This aspect of the operations for the load balancer 120 is similar to the operation in FIG. 3 for each translation front end 110.

The concept of using translated segments stored in a cache to reduce processing and communication traffic in a MT system may be extended to the back end of the MT system for access by the segment translation servers 130. FIG. 5 shows an example implementation of a segment translation server cache 510 shared by the segment translation servers 130 of FIG. 1 or 2. Upon receiving a segment to be translated from the load balancer 120, a segment translation server 130 first looks up the segment translation server cache 510 for an existing translation for the segment. When a suitable translation is found in the segment translation server cache 510, the segment translation server 130 retrieves that translation from the segment translation server cache 310 and sends it to the load balancer 120, which directs it to a respective originating translation front end 110 and moves on to process the next segment to be translated. If there is no corresponding translation for the segment in the segment translation server cache 510, the segment translation server 130 proceeds to translate the segment.

The segment translation servers 130 in the above MT systems can include a decoder which translates a segment using a translation model for translation between the source language and the target language and a language model for the target language; and a local cache operable to store data retrieved from the language model and to serve the stored data to the decoder. The decoder communicates with language model servers 210 to request for information on each of n grams for possible translations of the segment and associated statistical data.

Figure 6:
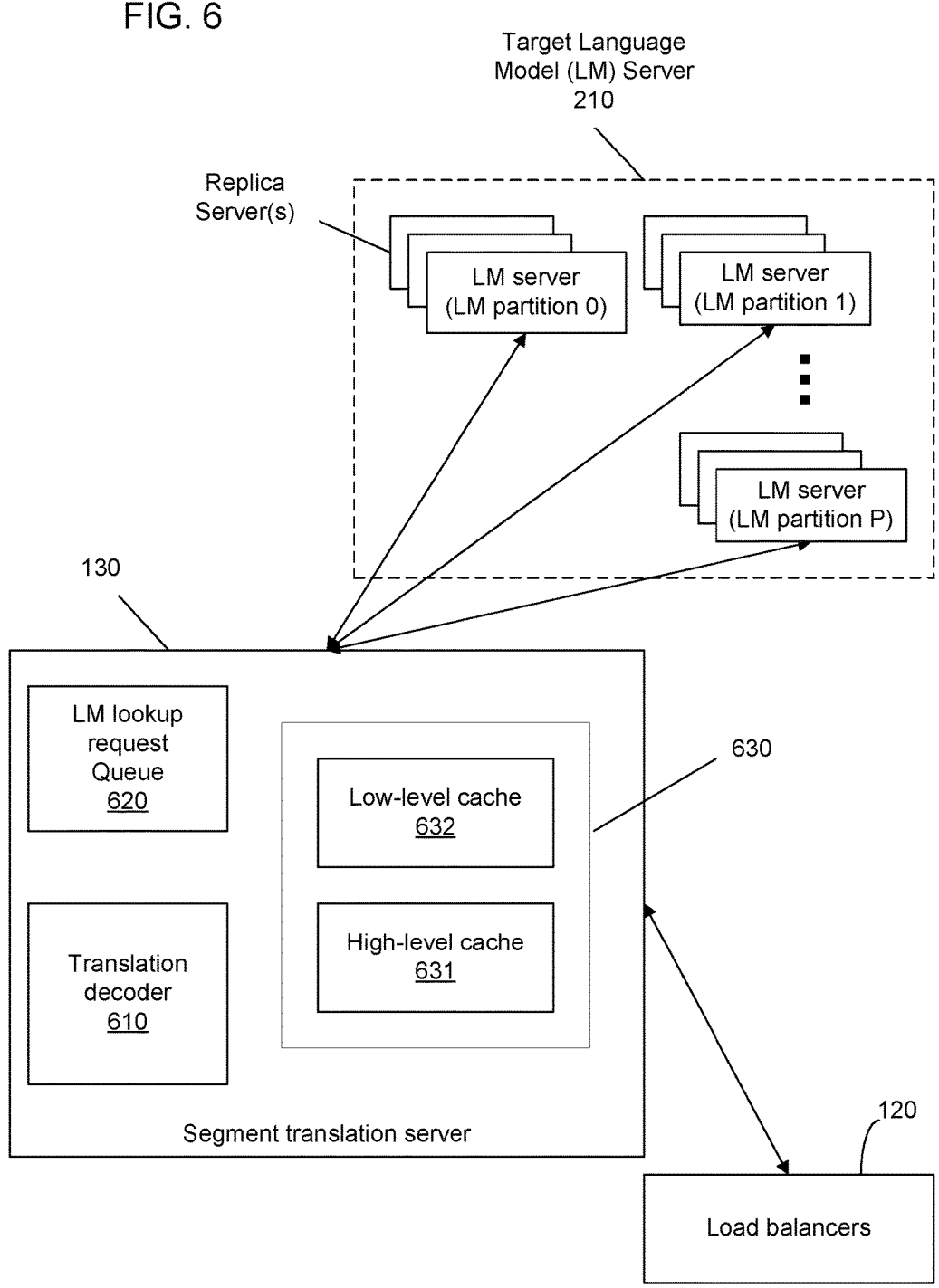
FIG. 6 shows an example of a segment translation server having a translation decoder, a LM lookup request queue, and a local cache.

FIG. 6 shows an example of a segment translation server 130 having a translation decoder 610, a LM lookup request queue 620, and a local cache 630. The local cache 630 in this example includes a high-level local cache 631 and an optional low-level cache 632. The high-level cache 631 and low-level cache 632 can be used to store selected LM data for use by the segment translation server 130 without accessing the LM servers 210. The high-level cache 631 may be configured to store selected LM data obtained during translating a segment so that all n grams needed for the current segment are available within the segment translation server 130.

In operation, the high-level cache 631 may be emptied in some manner so that the stored LM data does not accumulated beyond a certain limit. In some implementations, the segment translation server 130 periodically deletes the content of the high-level cache 631. As a specific example for this periodic deletion, the high-level cache 631 may be deleted after a segment is translated. In another implementation, the stored LM data in the high-level cache 631 may be marked as "old" and may be deleted if such "old" data is no longer re-used in translating a new segment when the high-level cache 631 is running out of space to store new LM data obtained from the language model.

The low-level cache 632 may be implemented as an optional feature in the segment translation server 130 to store frequently used LM data. Generally, the data in the low-level cache 632 is not emptied after translation of each segment and is retrained for a period longer than the data in the high-level cache 631. Hence, the LM data in the low-level cache 632 is relatively permanent and the LM data in the high-level cache 631 is relatively temporary.

In other implementations, a single local cache may be used to have a high-level cache section and a low-level cache section that correspond to the separate high-level cache and low-level cache, respectively.

The LM lookup request queue 620 can be used to temporarily store requests for selected LM data from the language model generated by the decoder 610 while processing a segment. The queued requests are then sent out to one or more LM servers 210, e.g., sequentially in a first-in-first-out manner. The LM lookup queue 620 allows the requests to be made and thus served by the LM servers 210 at different times to reduce the wait time by the decoder 610. Also, queuing requests and sending the queued requests together can significantly reduce the overhead associated with contacting the LM servers 210. The local cache 630 and the LM lookup request queue 620 can operate in combination to process each segment efficiently. Different techniques can be used to operate the decoder 610 and the queue 620. Two examples are described below.

In one example, the decoder 610 operates in a two-pass processing scheme. First, the decoder 610 processes the segment without all the LM data needed from the language model before the LM data requested is received. A dummy lookup model may be used to allow for the decoder 610 to process the segment while waiting for the requested LM data. This is the first pass of the processing. After all of the requested LM data is received, the decoder 610 then uses the received LM data to finalize the processing.

In another example, a coarse, smaller language model or another translation resource that is different from the large language model in the LM servers 210, e.g., a resource server 230 in FIG. 2, may be used by the decoder 610 while the requests to the LM servers 210 are being served. The processing by the decoder 610 uses the coarse LM and produces an initial translation result. After the requested LM data is received from the LM servers 210, the decoder 610 then proceeds to update the initial translation result by using the received LM data.

In implementing the techniques in the above two examples, prior to sending out the requests to the LM servers 210 for data, the decoder 610 may pre-process the segment to be translated to prune less likely translations for the segment to reduce the number of the requests to be made to the LM servers 210 and to reduce the amount of the processing with the requested LM data. In the pre-processing, the decoder 610 uses a translation resource that is different from the large language model in the LM servers 210 or is more readily available than the LM servers 210, such as a coarse, smaller language model, to process the segment to produce an initial result, e.g., an upper bound on the best possible translation path for the segment. Next, the decoder 610 uses the initial result to produce requests for the needed LM data by using either one of the above two processing techniques and complete the translation of the segment after responses to all the requests are received.

FIG. 7 illustrates one exemplary operation of the translation decoder 610 of the segment translation server 130 in FIG. 6 in translating a segment 701. Initially, the decoder requests and retrieves from TM servers the TM data associated with the translations of the segment to be translated, e.g., all possible translations of phrases or extensions in the target language (step 710). An extension extends a candidate translation by one of the phrases that are possible given the previously used phrases. While the requested TM data is being retrieved, the decoder sets a value for each n gram to be looked up from the LM model at some initial value, e.g., a random value or a constant value. As an example, the candidate translations can be set to zero (step 720). The decoder conducts a phrase iteration to search for the best phrases from one end to the other end of the segment during which the LM is accessed multiple times when processing different possible phrases in each segment. In each iteration, the decoder performs a two-pass processing as follows. First all possible extensions of the current set of candidate translations are computed and possible extensions translation model scores to the possible extensions (step 730). The language model scores for the possible extensions are first obtained using available information prior to receiving requested LM data from the LM servers 210 (step 740). For example, predetermined values assigned to n grams in a dummy lookup table and language model scores stored in a local cache including a high-level cache and a low-level cache (step 740) may be used. This is the first pass in processing each phrase within the segment. Next, the obtained language scores for the possible phrase are updated by using received language model data from the LM servers (step 750). This is the second pass in processing each phrase. Based on the updated scores, the decoder removes translations with poor scores (step 760) and further determines whether the end of the current segment is reached (step 770). If the current segment still has one or more extensions to be processed, the decoder iterates the above process. Otherwise, the decoder extracts the best translation for the segment and sends the translated segment 702 to the load balancer 120.

FIG. 8 shows an example of a processing step (step 740) in FIG. 7 before the requested LM data is available to the decoder. For each possible phrase or extension from the translation model for a segment to be translated, the decoder first looks up the high-level cache for any of possible n grams in the target language for each possible translation and associated statistical data (steps 810 and 820). When the information is available in the high-level cache, the decoder completes the translation using the information to produce the translated segment (step 830). When the information is not available in the high-level cache, the decoder then looks up the low-level cache (steps 840 and 850). If the information is in the low-level cache, the decoder marks this status (step 860) and proceeds to use information in both the high-level cache and low level cache to complete the translation (step 830). When the information is not in the low-level cache, the decoder makes requests in the LM lookup request queue for data from the language model (step 870). The received LM data is placed in the high-level cache and low level cache (step 880) and the translation is completed (step 830).

During the phrase iteration when translating each segment, the two-pass processing (steps 730, 740 and 750, FIG. 7) may use another language model resource in the system to perform an initial translation and then use the language model to update and finalize the translation. One example for such a language model resource is a second language model that is smaller than the language model stored on the language model servers 210, for example.

Figure 9A:
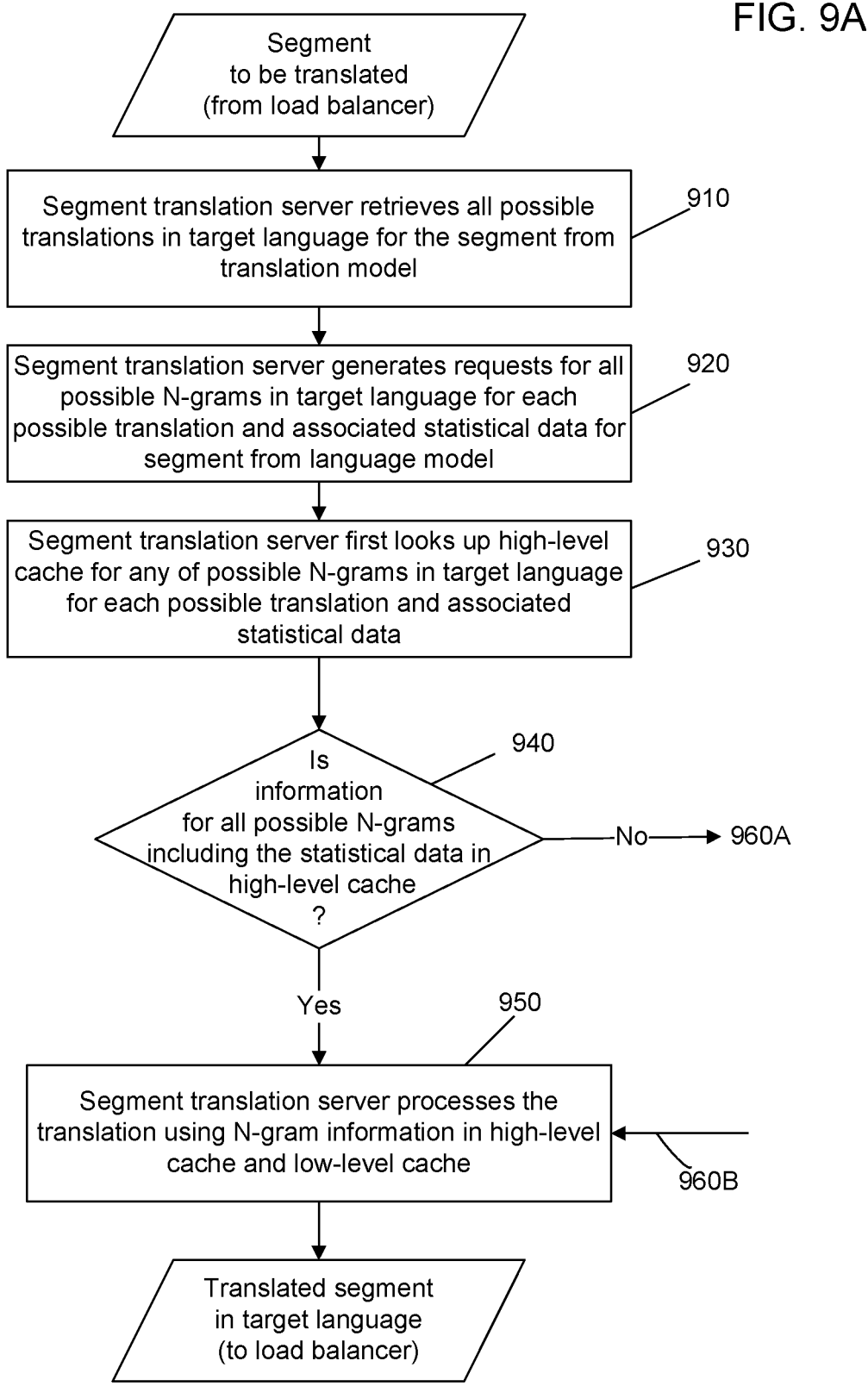
FIGS. 9A and 9B show an alternative operation of a translation decoder.
Figure 9B:
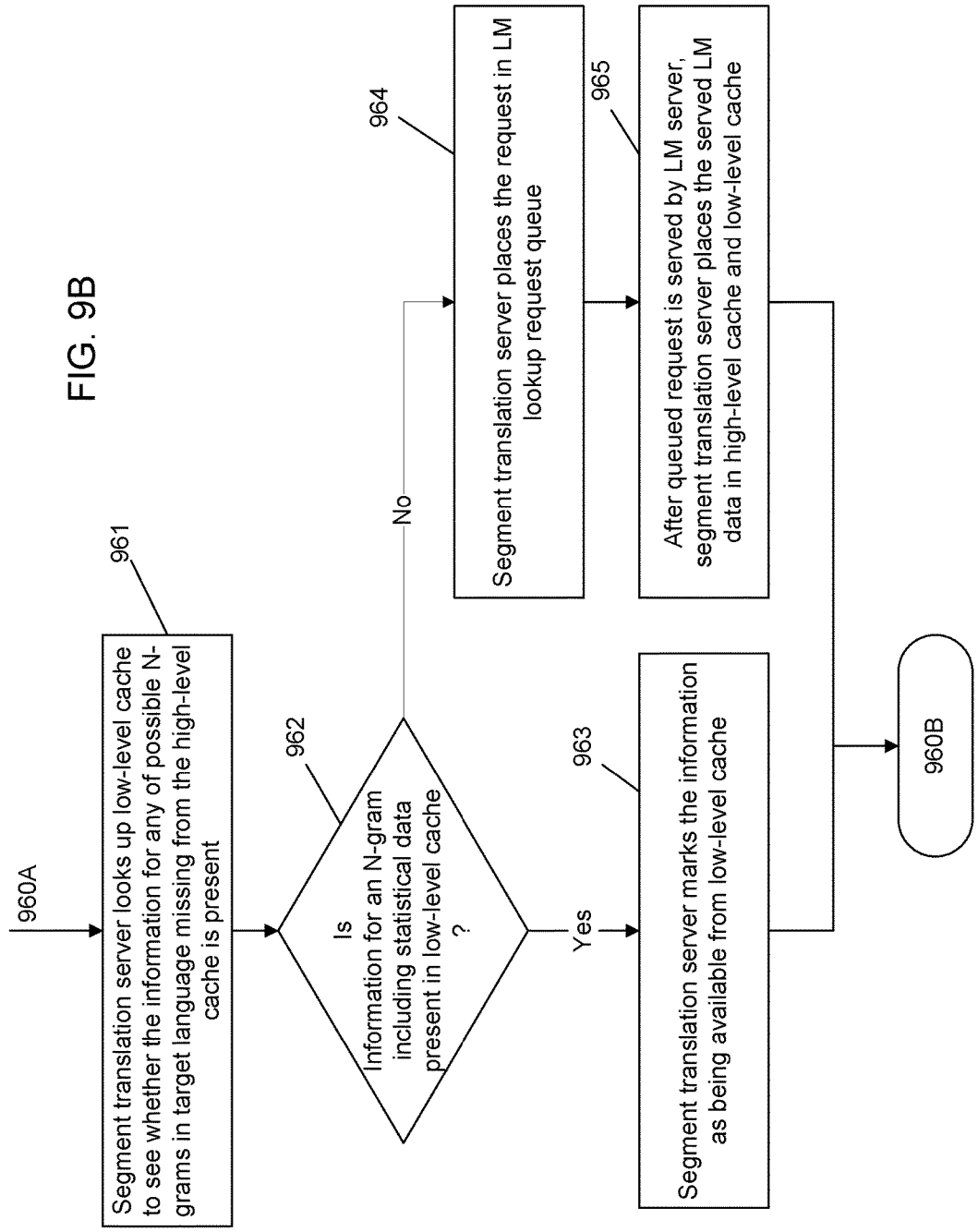

The segment translation server 130 (FIG. 6) can be operated in other configurations. For example, FIGS. 9A and 9B show an alternative operation of the system of FIG. 6 where the language model is accessed once in the process of translating a segment and the segment translation server 130 includes both a high-level cache 631 and a low-level cache 632 as part of the local cache 630.

After receiving a segment to translate from the load balancer 120, the segment translation sever 130 requests and retrieves all possible translations in the target language for the segment from the translation model stored on the servers 220 (step 910). Based on received possible translations from the translation model, the segment translation server 130 generates requests for all possible n grams in the target language for each possible translation and associated statistical data for the segment from the language model stored on the language model servers 210 (step 920). Prior to sending the requests to the language model servers 210, the segment translation server 130 first searches the local cache 630 to see if any language model data in the requests exists and sends a generated request to the language model servers 210 of the local cache 630 does not have the data. First, the segment translation server 130 looks up the high-level cache 631 for any of possible n grams in the target language for each possible translation and associated statistical data (step 930). The segment translation server 130 looks up the high-level cache 631 to determine whether all possible n grams are present (step 940). If so, the segment translation server 130 completes the translation for the segment without sending out the generated requests to the language model servers 210 (Step 950).

Otherwise, the segment translation server 130 performs additional processing (Step 960A). The low-level cache 632 is searched by the segment translation server 130 for language model data for any n grams not found in the high-level cache 631 with the language model (steps 961 and 962). If the requested information for one possible n gram and statistical data is in the low-level cache 631, the segment translation server 130 marks this presence for that particular n gram so that a respective generated request (step 920) is not sent out to the language model servers 210 (step 963). In addition, for an n gram that is initially found in the high-level cache 631, the request for that particular n gram is not sent out to the language model servers 210 either. If the segment translation server 130 cannot find any information for an n gram in either cache, the generated request is then placed in the LM lookup queue 620 and is sent out to the language model servers 210 (step 964). The language model data received from the language model servers 210 is stored in one of the caches depending on the nature of the respective n grams (step 965). For an n gram that is frequently used, its language model data can be saved in the low-level cache 632. For an n gram that is used in translating the current segment but is not likely to be used frequently in the target language, the received data can be stored in the high-level cache 631, which is frequently emptied. At this time, the language model data for all possible n grams for translating the segment are somewhere in the local cache 630. Accordingly, the segment translation server 130 completes the translation of that segment based on the language model data (Step 950).

Figure 10:
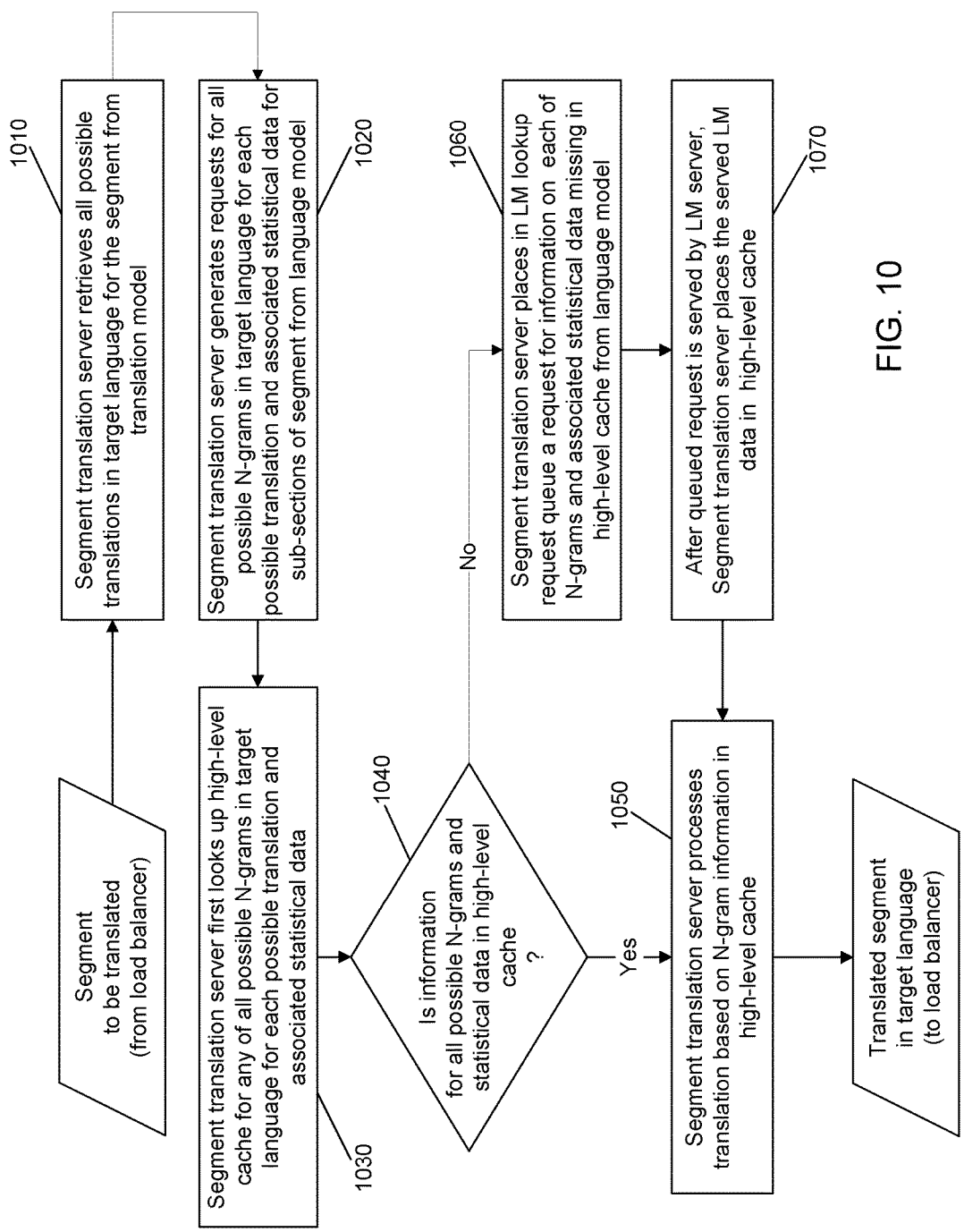
FIG. 10 is a flowchart for one exemplary processing flow of a segment translation server having a high-level cache without a low-level cache.

FIG. 10 shows an example operation of a segment translation server 130 having only a high-level cache 631 without a low-level cache 632. The initial processing (steps 1010 through 1040) is similar to the initial processing just described (steps 910 through 940). If the language model data for any of the possible n grams is missing in the high-level cache 631, the generated request for that n gram is then placed in the LM lookup queue 620 and is sent out to the language model servers 210 (step 1060). The language model data received from the language model servers 210 is stored in the high-level cache 631 (step 1070). This process of placing the generated request in the LM lookup request queue 620 and storing the received language model data in the high-level cache 631 is performed for all n grams whose language model information is initially not in the high-level cache 631. After all the requested language model data is received, the segment translation server 130 completes the translation of that segment based on the language model data (step 1050).

FIGS. 11A and 11B show another example processing flow of the segment translation server in the system of FIG. 6 where the segment translation server 130 uses language data from another available translation resource to process translation of the segment while the queued requests in the queue 620 are being served. For each segment to be translated, the segment translation server 130 uses the decoder 610 to request and retrieve from the TM servers 220 the TM data associated with the translations of the segment to be translated, e.g., all possible translations of phrases or extensions in the target language (Step 1110). The segment translation server 130 then generates requests for all possible n grams in the target language for each possible translation and associated statistical data from the language model (Step 1120). The segment translation server 130 determines whether the requested LM data is in the segment translation server 130 (Step 1130). If yes, the segment translation server 130 performs the translation using the available LM data to produce the translated segment (Step 1140). If the information is not in the segment translation server 130, the segment translation server 130 places a request for each of missing n grams and statistical data in the LM lookup request queue 620 (Step 1150) and proceeds to process the translation while waiting for a response to the request (Step 1160). During this period, the segment translation server 130 uses language data from another available translation resource (e.g., the resource server 230 (FIG. 2)) to process translation of the segment (Step 1161). The segment translation server 130 continues the processing with the data from the other available translation resource until all requested LM data is available (Step 1162). After receiving all requested LM data, the segment translation server 130 uses the newly available data from the LM servers 210 to update processed result that is initially produced by using the other resource and to produce a final translation (Step 1163).

Further details of various features described above and other features for automated machine translation are provided in the following sections.

Encoding and Accessing a Distributed Language Model

This section describes aspects of MT systems for translating text and document from one natural language, such as Chinese, to another natural language, such as English. The examples here may be used to address the problems of how to efficiently handle large language models used during the translation process to provide statistics about the frequency of occurrence of various language phrases. The quality of translations can generally be improved if the system is able to utilize a larger language model, such as n-grams with n greater than 3.

As part of the translation process, a statistical translation system needs information about how often various words, phrases, or sequences of words occur in order in a target language. This information is used to select target language translations that are more understandable. The language model information is usually collected by computing the frequency of occurrence of sequences of words in a large training corpus of documents. As an example, a collection of such data may yield the following information:

("is", "the", "only", "person")→9234 occurrences
("is", "the", "only", "person", "that")→173 occurrences
("is", "the", "person", "only", "that")→1 occurrence where the strings of words on the left represent various possible sequences of the words and the numbers on the right represent the number of occurrences in the training corpus of documents. The general form of language model data can be a sequence of words that map to a value, which may be any arbitrary byte sequence and can be either an integer or a floating point value in some common MT systems. A language model can be used to keep information for all word sequences up to n in length by using an n gram language model. Various machine translation systems use n grams with relatively small n values in their language models, e.g., 2-gram or 3-gram language models, so that the language models can be sufficiently small to be stored on a single machine.

The machine translation techniques described here can be used for very large language models in machine translation systems and other systems that can advantageously use large language models, such as automatic speech recognition systems. One approach is to partition the language model data over a set of distributed language model servers across multiple machines, possibly with replication for each partitioned piece of the language model state. Large language models have n-grams with n greater than 3 (e.g., n=4, 5, 6, etc.) and can be used to increase quality of the machine translation. FIGS. 1 and 2 illustrate examples of such systems, where the language model can include large n-grams with n greater than 3. In operation, one or more translation servers receive requests to translate a particular fragment of text from a source language into a particular target language. Often the request is at the granularity of a single sentence. The translation servers retrieve the appropriate pieces of language model data from the language model servers. Network remote procedure calls (RPCs) from processes that perform the actual translation work (e.g., segment translation servers 130 in FIG. 2) to the language model processes (e.g., LM servers 210 in FIG. 2) can be used for requesting and retrieving LM data.

An off-line process can be used to build language model data structure with the various (n gram→value) key/value pairs partitioned into K pieces. It is often useful to partition the n grams so that n grams whose values are likely to be needed as part of handling the same or similar translation requests that reside in the same partition. This tends to minimize the number of distinct partitions that need to be accessed by the translation server. One way of achieving this is to partition by the first or last M words in the n gram, e.g., partition by the last two words of the n gram.

Within each server, the lookup of an n gram value within the partition should be configured to be efficient. This is because translation may require each partition to be used for many hundreds of thousands of lookups per second. At the same time, it is useful to represent the language model data compactly, so that the total amount of memory needed to hold the language model is reduced. Accordingly, the number of partitions can be reduced and the number of machines required to serve the language model can also be reduced.

One technique for encoding the n gram data is to assign each word a unique integer ID with more common words being assigned lower numbers. This ID assignment happens during the building phase of the language model. Consider the training data from a corpus of documents below:

("is", "the", "only", "person")→9234 occurrences
("is", "the", "only", "person", "that")→173 occurrences
("is", "the", "person", "only", "that")→1 occurrence The same data can be represented in the following simplified form with ID numbers:

```
13  3   53    1037         -> 9234

13  3   53    1037  73     -> 173

13  3   1037  53    73     -> 1
``` where "13" is the ID number for word "is," "3" for "the," "53" for "only," "1037" for "person," and "73" for "that." This use of the ID numbers compresses the size of the data for the language model and the effect can become significant for very large language models. The following is an example of n grams for the language model grouped into a set of blocks showing a sequence of n grams and associated values in a sorted order:

```
1388 > 6                  [Bob]
1388 2 -> 5               [Bob </S>]
1388 3 -> 3               [Bob,]
1388 3 2 -> 6             [Bob, </S>]
1388 3 4 -> 2             [Bob, the]
1388 3 4 11 -> 3          [Bob, the "]
1388 3 4 11 2454 -> 1     [Bob, the " grand]
1388 3 4 11 7379 -> 1     [Bob, the " Father]
1388 3 4 11 20940 -> 1    [Bob, the " sailor]
1388 3 4 11 38117-> 1     [Bob, the " Dude]
1388 3 4 53 -> 3          [Bob, the more]
1388 3 4 53 587 -> 1      [Bob, the more low]
``` where, from the left to the right, is the ID numbers, the number of occurrences, and the corresponding text.

In some implementations, the language model data is buffered in memory to be added to a block until 256 unique word identifiers have been seen, or a maximum number of n grams have been accumulated for this block's data (e.g., a max of 1024 n grams). The format uses a lexicon that maps up to 256 unique word IDs to a set of local IDs in the range from 0 to 255. The lexicon can be encoded using any convenient method. The actual n gram data is then encoded in terms of local IDs. Lookup of a particular n gram first translates the desired word IDs into local IDs, and then performs a fast scanning for the appropriate sequence of local IDs to find the right value.

Given the n grams in the block, a shared prefix length that is shared by all n grams in the block can be computed. Within a block, all the entries are segregated into the different n gram length and rewritten in terms of local IDs. The actual block format for the language model data is:
  shared_prefix_size: byte
  value length: byte
  # of entries in lexicon: varint32
  N word ids (lexicon): N values
  # entries table: pairs repeated each distinct n gram length in the block
  K: byte
  # of entries of length K: varint32
  "0": byte (literal 0 marking end of table)
The above data block is followed by a separate section for each of the different lengths of n grams in the block. Each entry in a K-gram section for a block a shared prefix of P is represented as a sequence of K-P bytes to represent the trailing (K-P) local word IDs of the K-gram, followed by the value as a "value_length" byte sequence.

Each block is given a key that is a string representation of the last n gram stored in the block. The block contents are encoded as the value in an stable and this key is used as the stable key. This ensures that looking up. Here is an example:

```
Shared prefix length: 1
Length of values in this block: 1
Lex: 1388 2 3 4 11 2454 7379 20940 38117 53 587
nwords: <1,1>
nwords: <2,2>
nwords: <3,2>
nwords: <4,2>
nwords: <5,5>
"0"
1-gram section:
    [ ]:6
2-gram section:
    [ 001 ]:5
    [ 002 ]:3
3-gram section:
    [ 002 001 ]:6
    [ 002 003 ]:2
4-gram section:
    [ 002 003 004 ]:3
    [ 002 003 009 ]:3
5-gram section:
    [ 002 003 004 005 ]:1
    [ 002 003 004 006 ]:1
    [ 002 003 004 007 ]:1
    [ 002 003 004 008 ]:1
    [ 002 003 009 010 ]:1
```

Using language modeling for machine translation often requires a system to look up shorter n grams in case a longer n gram is not found. The shorter n grams can be used for backoff and smoothing. Shorter n grams can be generated by stripping words from one end, either at the front end or the rear end of an n gram. As an example, a client requesting for machine translation may ask for the sequence "A B C D E", where each letter represents one word, and require stripping from the front of the sequence. If the full n gram is not found on the server, then the client needs the sequence "B C D E." If this shorter sequence again is not found, an even shorter sequence "C D E" and so on are needed. The shortest sequence is "E" if nothing longer can be found. In order to do the search efficiently, the n grams can be partitioned by their last word. In the above example, all n grams ending in "E" can be grouped into the same partition and stored in the same machine. This way, the backoff to shorter n grams can happen in one single server, without making a new request to a different server.

Partitioning by last word may lead to very unbalanced partitions. Balance can be improved by partitioning based on the last two words or even longer sequences of length S. In order to ensure that shorter n grams are on the same server, unigrams (or sequences of length S-1 and shorter) can be replicated on all partitions. An alternative to replication of shorter n grams on all partitions is to issue a second request in case n grams of lengths S-1 or shorter are needed.

The size of a language model can be significantly reduced and partitions can be made more evenly sized by removing certain entries from the language model with only minimal impact on the quality of the language model. One way is to remove longer n grams that end in frequently used shorter n grams. As an example, assume "D E" is a frequently used bi-gram. All 4- and 5-grams ending in "D E" can be removed (e.g., the n gram "A B C D E"), and only the trigrams (e.g., "C D E") are kept. The model may store a flag with "C D E" or employ other means to note that certain n grams have been removed.

In some implementations of the language model, the client code uses a simple interface that permits the value for a particular n gram to be requested. Internally, the client library that stores language model data decides which partition the requested n gram resides in, and queues a request for the n gram to be sent to that partition. When the number of queued requests exceeds a threshold, a bulk lookup request is sent to the server responsible for that partition. A user-level "Wait( )" operation can be used by a client to force all pending lookups to be sent to the appropriate servers. The operation waits until they complete before returning to the caller.

The segment translation server (in which the client library is located) can also implement a simple hash-table based cache of n gram→value mappings, avoiding the need to communicate with the language model servers for commonly-needed n grams. One example of this cache is the low-level cache 632 (FIG. 6). Because it can be difficult to determine the set of n gram values that will be needed by a particular translation iteration, the translation system can be structured to run each iteration as two passes. The first pass is run with a dummy language model that returns a constant value (or no value at all, or a random value) for each n gram that is looked up, but also enqueues a lookup with the language model servers to fetch the real n gram value. The translation iteration first is run with the dummy language model, then "Wait( )" is called to ensure that all the pending language model lookups complete. At that point, all the language model values are available within the translation server itself, and so the translation process is run again with the real language model, and the values from the distributed language model are used to decide which candidate translations are worth considering in the next iteration. A second cache, e.g., the high-level cache 631 (FIG. 6), can be used to keep track of all n grams requested for translating a particular sentence and guarantee that probabilities are available while this sentence is being processed. The translator signals the end of the sentence, at which time the high-level cache can be emptied.

In some implementations, the dummy language model can use a small non-distributed language model on a single server as a coarse LM to either process the translation during the wait period for the LM data to be served or to process the translation before the LM data is requested and generate requests based on the initial translation result using the coarse LM. In some implementations the dummy language model returns an upper bound on the probability instead of the true probability by, for example, storing for each word the highest probability that exists in the distributed language model to produce the word. To allow efficient access to the language model, the number of requested probabilities from the distributed language model is kept small to reduce access and search time. Hence, if at a given point in the translation search process the system knows that a certain hypotheses extension requires a language model probability, but the hypotheses extension will be pruned away if the language model probability is smaller than X, then a dummy language model that actually returns an upper bound on the probability makes it possible to prune requests to the distributed language model.

The two-pass language model access per decoder iteration may be implemented on different levels of granularity and integrated into different search architectures. For example, the two-pass process can occur once per translation of a segment. In some cases, during the first pass the sentence would be translated completely with the dummy language model. The first pass may produce an efficient pruned representation of the search space. The second pass then re-scores the representation of the search space using the probabilities requested from the distributed language model. In another example, the two-pass process can be carried out multiple times during the translation of a segment. For decoders that structure the search space by iteratively extending each hypothesis in a set of hypotheses by appending a finite set of possible extensions, dummy requests can be issued whenever a set of hypotheses is extended.

In partitioned systems, different partition servers can have different processing speeds. Language model requests to different machines can thus return at different points in time. The Wait( ) operations used in the segment translation servers have to wait for the slowest partition. If that slowest machine has a problem that cannot be corrected quickly, e.g., lost power or a network problem, the wait time can be prolonged and unacceptable. One way to deal with this problem is to have a timeout for the Wait( ) and return a probability estimate, e.g. the probability assigned by the dummy language model or a different small in-memory language model. Another way to mitigate this problem is to replicate the same language model partition multiple times on different machines so that a different replica can be used for obtaining the language model data after there is a timeout for the initial server for the partition. In addition, requests may be sent to all different replicas of the same partition of the language model at the same time and select the first returned data for the translation.

The Wait( )—calls in the translation servers can be used to achieve synchronization of requests to different servers for translating the same segment. One method to reduce the wait time is to interleave different iterations of language model requests. Hence, instead of waiting until all probabilities are returned, a system can score hypotheses without the language model probabilities or use an estimate of the score, and update the hypothesis scores as soon as the language model probabilities arrive. In this mode of operation, either each language model probability request would have to store a pointer to the search hypothesis where it is needed or each translation hypothesis would have a pointer to the missing language model probabilities. In this variant, the intermediate hypotheses scores would normally be approximate. Whenever there is a need to have exact scores a Wait( ) could be issued.

A translation server, e.g., a segment translation server, can be configured to keep track of n gram histories and then evaluate different continuations of tracked n grams. For example, a history may be "A B C D," then explored continuations may be "A B C D E," "A B C D F," etc. The language model client represents these histories by integer numbers and starts enumerating them at the beginning of a sentence or other translation unit. Translating an individual sentence usually requires a relatively small number of different histories, e.g., thousands or millions, compared to all possible n grams ($10^{20}$ and more), so only a few bytes are sufficient for the integer. This technique can be used to make the action of the translator independent of the length of the history and also can save storage space since histories can become long. The client may use hash functions to map between integers and histories, may use the integer as an index into an array of n grams, or use other means of keeping track of the histories.

Machine Translation in Adaptive and Scalable Manner

A translation system that is accessible to a large volume of users, such as users on the Internet, can experience varying amounts of load at different times. Such variation can be caused by, e.g., varying number of requests, requests of varying degrees of difficulty, varying proportions of requests for different language pairs, etc. This section describes features in automated machine translation systems to handle varying amounts of load caused by these and other variations in the systems and to reduce degradation in the quality of the service.

In order to scale up the capacity of an automated translation system, the underlying translation technology for the system should be able to operate at different points of the tradeoff between translation speed and translation quality, and the overall system should be able to adapt to varying loads. For example, the system may be configured to translate at a slow processing speed (e.g., 10 words/second) with a high-quality translation; a medium processing speed (e.g., 20 words/sec) with a medium translation quality; or a high processing speed (e.g. 100 words/sec) with a low-quality translation or a phrase-for-phrase or word-for-word gloss. To achieve a high quality translation, the translation server or engine (e.g., the segment translation server 130 (FIG. 2) may require a number of other back-ends, or servers that provide information it uses in the course of translation. Examples include a translation phrase dictionary server, a language model server, a transliteration server, etc. Obtaining information from these backend resources takes a certain amount of time. In some of the lower-quality translation modes, the translation server can skip using some of these back end resources to reduce the translation time at a price of a reduced translation quality.

For example, the translation server can skip using the transliteration resource and handle words that would otherwise be transliterated in another way, e.g., omitting the words, or keeping the original words in the translation. Another example is skipping use of the language model, and only using other translation information (e.g., phrase table and reordering probabilities) to derive the translation. Instead of skipping a component completely, the translation server may also choose to make fewer requests to the language model, thereby reducing the amount of communication and speeding up the translation. Hence, the translation server may decide to only request 3-grams or 4-grams instead of 5-grams from the language model. The end to end latency for all quality levels can be reduced by parallelizing the computation in both the front end translation server and the various back end servers. During the wait from the back end resource servers such as the LM servers, the translation server can perform the parts of the computation not dependent on the back end results. By doing the front end computation in parallel with the wait time for the back end resource servers (e.g., LM servers), the latency of the back ends does not contribute to overall translation latency unless the latency of the backend servers is larger than the time spent on the local computation. The back end latencies themselves can be reduced by partitioning the data across multiple physical machines which are accessed by the translation server as a single virtual server.

Conversely, one partitioned virtual server can serve multiple back end data sources. For example, a translation system may have multiple phrase based translation lexica trained on different data sources. These multiple models are served from a single partitioned virtual server and re-partitioned on the client side of the translation engine. This allows complex multi-part translation models to be served from a single partitioned server.

To reduce translation processing, an automated machine translation system can include a cache to store translated text and document sections. Document sections can be words, phrases, sentence fragments, sentences, paragraphs, entire texts/documents, etc. As illustrated in FIG. 3B, a cache can map a source-language section to one or more target-language sections. Each target-language section is marked with information about its translation quality level. Thus, the cache can contain translations at different levels of translation quality. The cache may also contain manual translations made by human which usually have a high level of translation quality and are obtained in a separate process.

An automated machine translation system can include a replicated set of translation front ends, e.g., the translation front end servers 110 (FIGS. 1 and 2), a load balancing component, e.g., the load balancer 120 (FIGS. 1 and 2), a translation cache, e.g., translation cache (FIG. 3A, 4, or 5), translation engines, e.g., segment translation servers 130 (FIGS. 1 and 2), and translation engine back ends, e.g., language model servers, translation phrase dictionary servers, and transliteration servers. The front end receives text or document translation requests. The text or document to be translated is divided into sections or segments. The translation for a segment can be looked up in the translation cache, which may yield a translation of a certain translation quality. If there is no translation in the cache, or the quality level is not sufficiently high, requests for translations of the segments are communicated to the load balancing component. The load balancing component maintains some information about the overall system load and the load of the segment translation servers. Using this information as well as information about the available capacity, the load balancing component applies a load balancing policy to determine how to process the section translation requests. A lower-quality translation from the cache may be used if the load level is high enough, or the segment to be translated may be sent to a translation back end to be translated at a specified level of quality. The load balancing logic may also take into account other factors. For example, segments from sections higher up on a Web page or earlier in a document, which can get more attention from the user, can be translated at a higher level of quality. Also, such sections can be given a higher priority, so that they are translated first, and the first parts of the translated Web page or other document can be returned to the user sooner.

In addition, an automated machine translation system may be designed to generate lower-quality translations for some parts of the Web page or document quickly, e.g., for the text that is lower down on the Web page, and deliver the translated contents to the user while processing the same parts of the Web page or document in the background for higher-quality translations. As translation at the higher quality becomes available, the system can replace the lower-quality translations already delivered to the user with higher-quality translations. The previously translated page may be in part or entirely replaced in a dynamic manner when the higher quality translation is produced in the background. This can be done using a variety of mechanisms, including using client-side scripting languages such as JavaScript to mutate parts of the translated document that have already been sent to the client computer.

Portions or sections within Web pages or documents that are to be translated at a high-quality can be identified in a variety of ways. One strategy is to translate the initial part of a document at the high quality because this part is likely to be carefully examined by the user or may be the only portion read by the user. Another strategy is to identify the importance of regions of a Web page or document on the basis of the document structure or HTML markup, e.g., as section headers, sections in a larger font size, or topic sentences in each paragraph.

The translated segments are assembled by the system, e.g., the translation front end server 130 (FIG. 1 or 2), to form the translated text or document which is returned to the requestor. In a system corresponding to FIG. 1 and implemented with a translation cache, there can be variations in how the translation cache with translations at different quality levels interacts with the load balancer 120. For example, the system may be designed to look up every segment in the cache, send everything to the load balancer, and let the load balancer determine whether to use the cache entry or whether to send the segment to a translation engine. Alternatively, the system may be designed to send only certain segments to the load balancer. There can be a variety of load balancing policies. There can be more than one type of translation engines (e.g., the segment translation servers 130) in the system, and this provides additional flexibility to the load balancing. For example, a mixture of fast segment translation servers with low translation quality and slow segment translation servers with high translation quality may be used.

Combining Manual and Automated Translation in Automated Machine Translation Systems This section describes techniques that combine manual translations and automated translations in an automated machine translation system to provide various translation options. The following process may be used to build a digital library for the manual translation and to use the library during the automated machine translation. The systems described in this application may be used to implement these features. Other MT systems may also implement these features.

First, a wide range of documents requested by users for machine translation are analyzed to determine which translations will be performed manually. This process can include analysis of previously translated documents to determine which sections in the analyzed documents appear frequently, and such frequently used sections can be candidates for manual translation. The sections in the analyzed documents can include words, phrases, sentences, paragraphs, embedded documents, embedded Web pages, and others. In addition, contents and other features of the analyzed documents can also be analyzed to identify additional candidates for manual translation. Examples include newspaper headlines, titles and subtitles in articles, frequently used words and phrases from Web searches, and important navigational phrases from Web pages.

Second, manual translations of the identified candidates for manual translation are obtained and the manual translations are stored in a translation database, e.g., a translation cache, as shown in FIGS. 3A, 4 and 5. The database of manual translations can then be used in an automated machine translation system. Each stored manual translation can be labeled as a high translation quality so that a system, e.g., the system of FIG. 1 or 2, can use the quality label in selecting translations for a segment.

The database of manual translations in an automated machine translation system can be updated or revised. Requests to translate additional material by human can be derived automatically from information obtained from the running machine translation system. For example, system statistical data on the machine translation activities can be used to extract information on frequently translated text sections and other information that can identify text sections to be manually translated. The system can periodically or continuously monitor such system statistical data to generate a list of newly identified text sections to be manually translated. Manual translations of newly identified text sections are obtained to update the existing database for the manual translations.

The process for obtaining a manual translation of an identified text section may include a manual or automatic search on the web or other on-line repositories for existing translations. Such an existing translation can be retrieved and displayed to the client requesting the translation without using the system's translation resources to generate the translation. For example, the same breaking news may be available in several languages and the system can use the news reports in the target language to obtain a translation. Also, companies and organizations may make the same information available in several languages on line and such on-line documents can be searched by the system to obtain an existing translation.

Some manual translations may only be appropriate in certain contexts. For example, a certain translation for "home" may only make sense for a Web page where it is a label for a link to the Web site's home page. The manual translation database can include this type of information, and the translation system uses this information in translating web pages. In some implementations, a user could supply a specific translation database to be used for a specific translation request.

Applications of Distributed Models in Automated Processing Systems Beyond Machine Translation The above and other distributed system designs for automated machine translation based on partition, replication and load balancing to access large models and to provide scalable and adaptive processing can be applied to other automated processing systems beyond machine translation. Large language models can also be used in automated speech recognition, spam detection, optical character recognition, spelling correction and other automated language processing applications. The systems described above for machine translation, e.g., systems shown in FIGS. 1, 2, 3A, 3B, 4, 5 and 6, can be adapted to implement automated processing other than machine translation.

For example, an optical character recognition (OCR) system for converting document images into text can be built based on the system designs described above where a language model for characters can be used to replace the language model for words in machine translation; an automated spelling correction system can use a language model to efficiently find the most likely words that follow a certain n gram and to correct the spelling of a word. In addition, an automated speech recognition system can use a language model to predict the probability of words and an upper bound on the probability of a node in a true representation of a pronunciation dictionary and to translate a received speech into a text for the content of the speech. Furthermore, large language models can be used to filter emails based on the content in the emails in spam filtering applications. In these and other automated language processing applications, the partition and replication can be implemented to provide access to large language models that do not fit within a single machine and to handle a large volume of requests in a scalable and adaptive manner.

FIG. 12 shows an example of a distributed processing system 1200 that can be configured to provide a language processing function based on a large language model. The processing function of the system 1200 may be different from machine translation. This system 1200 includes a large language model that is partitioned and replicated on multiple language model servers 1240. The system 1200 also includes multiple front ends 1210 to handle input 1201 and output 1202, and multiple processing servers 1230 to process the input 1201 and produce the output 1202. Each front end 1210, after receiving the input 1201, divides the input 1201 into segments for processing by the processing servers 1230. A load balancer 1220 manages the work flow to different processing servers 1230 based on the work load at the processing servers 1230. Each processing server 1230 is operable to access the LM servers 1240 to obtain LM data and use the obtained LM data in processing a segment of the input 1201. This system 1200 can be a speech recognition system where each processing server 1230 is a speech recognition server. The input 1201 is an input speech from a person and is processed by speech recognition servers 1230 using the LM data. The output 1202 is text that is a transcription of the input speech 1201. The processing servers 1230 can also be implemented as OCR servers for OCR applications, spelling correction servers for spelling correction applications, and spam filtering servers for spam filtering applications.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the disclosed embodiments can be implemented using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The components of a computing system can be interconnected by any form or medium of digital data communication, e.g., a communication network. Examples of communication networks include a local area network ("LAN") and a wide area network ("WAN"), e.g., the Internet. A communication network that can be used to implement the described distributed processing may use various communication links to transmit data and signals, such as electrically conductor cables, optic fiber links and wireless communication links (e.g., RF wireless links).

Figure 13:
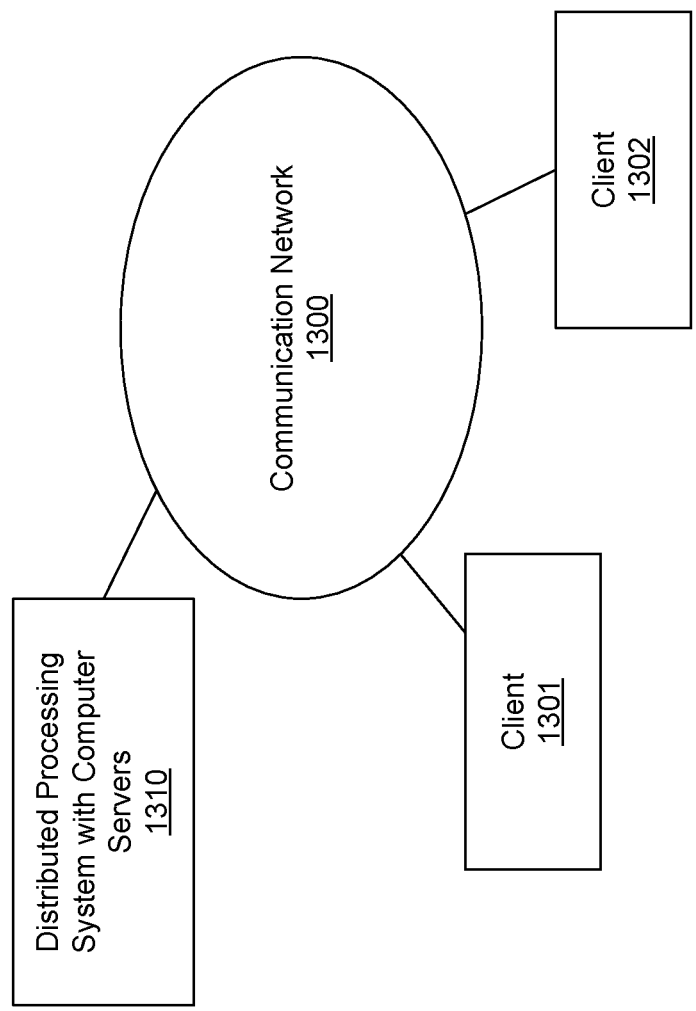
FIG. 13 shows an example computer system in a communication network that provides distributed processing.

FIG. 13 shows an example computer system in a communication network that provides distributed processing. This system includes a communication network 1300 that enables communications for communication devices connected to the network 1300, such as computers. For example, the communication network 1300 can be a single computer network such as a computer network within an enterprise or a network of interconnected computer networks such as the Internet. One or more computer servers 1310 are connected to the communication network 1300 to form a distributed processing system such as a system in FIG. 1, 2, or 12. The computer servers 1310 may be located at the same location or at different locations. In operation, one or more client computers (e.g., clients 1301 and 1302) can use the communication network 1300 to remotely access the distributed processing system 1310 to request for machine translation services or other services provided by the system 1310. The client 1301, for example, can send a request to the system 1310 for translation of a document. The client 1301 sends the document to the system 1310. After receiving the document, the system 1310 performs the requested processing. The output from the system 1310 is then sent to the client 1301 or is made available in the system 1310 to be accessible by the client 1301. The system 1310 can serve multiple clients at the same time.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method for translating a text, comprising:
   receiving the text in a source language;
   partitioning the text into a plurality of segments;
   obtaining, for each segment, one or more candidate translations in a target language;
   for each of a plurality of possible n grams in each candidate translation:
   identifying a respective partition of a language model containing the n gram, wherein each partition includes a subset of all n grams in the target language and statistical data for the same subset of n grams, each n gram being a sequence of n tokens in the target language, wherein n is a positive integer, and wherein each partition is maintained by a different server of a plurality of servers;
   sending a lookup request to the server maintaining the respective partition containing the n-gram;
   obtaining, from the server maintaining the respective partition containing the n-gram, statistical data for the n gram; and
   determining, for each segment of the text, a best candidate translation of the one or more candidate translations based on the obtained statistical data.

2. The method of claim 1, wherein the n-grams in a respective subset each have a plurality of common tokens at predetermined positions.

3. The method of claim 2, wherein n is greater than or equal to 3.

4. The method of claim 2, wherein the plurality of common tokens are the last two tokens in a sequence of tokens representing an n gram.

5. The method of claim 2, wherein the statistical data for a respective n gram comprises a relative frequency of occurrence of the respective n gram in the target language.

6. The method of claim 2, further comprising:
   in response to obtaining statistical data for a respective n gram from a server, storing the statistical data in a language model cache.

7. The method of claim 2, wherein obtaining, for each segment, one or more candidate translations in the target language, comprises:
   evaluating each segment against a translation model.

8. The method of claim 7, wherein the translation model comprises mapping information between the source language and the target language and scoring information associated with each mapping, the mapping information comprising a relation between (i) one or more tokens in the source language and (ii) one or more tokens in the target language.

9. The method of claim 8, wherein the translation model is stored on a plurality of translation model servers, each storing and operable to serve different partitions of the translation model.

10. A system comprising:
    a plurality of servers, wherein each server is configured to store a partition of a language model of a target language, wherein each respective partition of the language model includes a subset of all n grams in the target language and statistical data for the same subset of n grams, each n gram being a sequence of n tokens in the target language, and wherein n is a positive integer; and
    one or more processors configured to perform operations comprising:
    receiving a text in a source language;
    partitioning the text into a plurality of segments;
    obtaining, for each segment, one or more candidate translations in the target language;
    for each of a plurality of possible n grams in each candidate translation:
    identifying the respective partition of the language model containing the n gram;
    sending a lookup request to the server maintaining the respective partition containing the n-gram;
    obtaining, from the server maintaining the respective partition containing the n-gram, statistical data for the n gram; and
    determining, for each segment of the text, a best candidate translation of the one or more candidate translations based on the obtained statistical data.

11. The system of claim 10, wherein the n-grams in a respective subset each have a plurality of common tokens at predetermined positions.

12. The system of claim 11, wherein n is greater than or equal to 3.

13. The system of claim 11, wherein the plurality of common tokens are the last two tokens in a sequence of tokens representing an n gram.

14. The system of claim 11, wherein the statistical data for a respective n gram comprises a relative frequency of occurrence of the respective n gram in the target language.

15. The system of claim 11, further comprising:
    a language model cache configured to store statistical data for a respective n gram obtained from a server.

16. The system of claim 11, further comprising:
    a plurality of translation model servers, wherein each translation model server is configured to store a different partition of a translation model, and wherein the translation model servers are configured to perform operations comprising:
    evaluating each segment of the text against the translation model; and
    providing candidate translations for each segment.

17. The system of claim 16, wherein the translation model comprises mapping information between the source language and the target language and scoring information associated with each mapping, the mapping information comprising a relation between (i) one or more tokens in the source language and (ii) one or more tokens in the target language.

18. One or more computer storage media encoded with instructions that, when executed by one or more computers, cause the one or more computers to perform operations comprising:
    receiving a text in a source language;
    partitioning the text into a plurality of segments;
    obtaining, for each segment, one or more candidate translations in a target language;
    for each of a plurality of possible n grams in each candidate translation:
    identifying a respective partition of the language model containing the n gram, wherein each respective partition of the language model includes a subset of all n grams in the target language and statistical data for the same subset of n grams, each n gram being a sequence of n tokens in the target language, wherein n is a positive integer, and wherein each partition is maintained by a different server of a plurality of servers;

sending a lookup request to the server maintaining the respective partition containing the n-gram;

obtaining, from the server maintaining the respective partition containing the n-gram, statistical data for the n gram; and determining, for each segment of the text, a best candidate translation of the one or more candidate translations based on the obtained statistical data.

19. The computer storage media of claim 18, wherein the n-grams in a subset each have a plurality of common tokens at predetermined positions.

20. The computer storage media of claim 19, wherein n is greater than or equal to 3.

* * * * *